(12) United States Patent
Takeuchi et al.

(10) Patent No.: US 9,631,992 B2
(45) Date of Patent: Apr. 25, 2017

(54) PHYSICAL QUANTITY SENSOR, PRESSURE SENSOR, ALTIMETER, ELECTRONIC APPARATUS AND MOVING OBJECT

(71) Applicant: Seiko Epson Corporation, Tokyo (JP)

(72) Inventors: Junichi Takeuchi, Chino (JP); Takuya Kinugawa, Chino (JP)

(73) Assignee: Seiko Epson Corporation (JP)

( * ) Notice: Subject to any disclaimer, the term of this patent is extended or adjusted under 35 U.S.C. 154(b) by 83 days.

(21) Appl. No.: 14/639,231

(22) Filed: Mar. 5, 2015

(65) Prior Publication Data

US 2015/0268113 A1  Sep. 24, 2015

(30) Foreign Application Priority Data

Mar. 20, 2014  (JP) .................................. 2014-058505

(51) Int. Cl.
 G01L 9/00  (2006.01)

(52) U.S. Cl.
 CPC .......... G01L 9/0054 (2013.01); G01L 9/0052 (2013.01); G01L 9/0055 (2013.01)

(58) Field of Classification Search
 None
 See application file for complete search history.

(56) References Cited

U.S. PATENT DOCUMENTS

| | | | | |
|---|---|---|---|---|
| 5,518,951 A * | 5/1996 | Paynter | ................. | G01L 9/0055 438/403 |
| 5,761,957 A | 6/1998 | Oba et al. | | |
| 6,272,928 B1 * | 8/2001 | Kurtz | ................. | G01L 13/025 73/721 |
| 7,806,001 B1 * | 10/2010 | Shaw | ................. | G01L 9/0055 73/715 |
| 2007/0089526 A1 * | 4/2007 | Kurtz | ................. | G01L 9/0055 73/754 |
| 2008/0011087 A1 * | 1/2008 | Kurtz | ................. | G01L 9/0042 73/708 |
| 2008/0163695 A1 | 7/2008 | Ichikawa | | |
| 2011/0239772 A1 * | 10/2011 | Kurtz | ................. | G01L 9/0055 73/721 |
| 2015/0008544 A1 * | 1/2015 | Yazawa | ................. | G01L 9/0054 257/417 |
| 2015/0268113 A1 * | 9/2015 | Takeuchi | ............. | G01L 9/0054 73/721 |
| 2015/0276527 A1 * | 10/2015 | Takeuchi | ............. | G01L 9/0052 73/727 |
| 2015/0369681 A1 * | 12/2015 | Imai | ..................... | G01L 9/0055 73/727 |

(Continued)

FOREIGN PATENT DOCUMENTS

| | | |
|---|---|---|
| JP | 10-242479 A | 9/1998 |
| JP | 2006-003099 A | 1/2006 |
| JP | 2006-017623 A | 1/2006 |

*Primary Examiner* — Andre Allen
(74) *Attorney, Agent, or Firm* — Harness, Dickey & Pierce, P.L.C.

(57) ABSTRACT

A physical quantity sensor includes a plurality of diaphragm portions which are bent and deformed due to pressure reception, and a plurality of piezoresistive elements which are disposed in the diaphragm portions at different locations from each other and are electrically connected to each other in series. The plurality of piezoresistive elements constitute a bridge circuit.

15 Claims, 15 Drawing Sheets

(56) References Cited

U.S. PATENT DOCUMENTS

2016/0153856 A1* 6/2016 Hayashi ............... G01L 9/0054
  73/384
2016/0153857 A1* 6/2016 Matsuzawa ........... G01L 9/0054
  73/727
2016/0209285 A1* 7/2016 Nakajima ............... G01O 5/06
  73/384

* cited by examiner

PHYSICAL QUANTITY SENSOR, PRESSURE SENSOR, ALTIMETER, ELECTRONIC APPARATUS AND MOVING OBJECT

BACKGROUND

1. Technical Field

The present invention relates to a physical quantity sensor, a pressure sensor, an altimeter, an electronic apparatus and a moving object.

2. Related Art

Pressure sensors including a diaphragm which is bent and deformed due to pressure reception are widely used. As such a pressure sensor, a sensor is known in which a piezoresistive element is disposed on a diaphragm, and which detects a pressure applied to the diaphragm by detecting the bending of the diaphragm using a sensor element (see, for example, JP-A-2006-3099).

The pressure sensor disclosed in JP-A-2006-3099 includes an SOI (Silicon On Insulator) substrate having a diaphragm formed therein, and four piezoresistive elements are provided on the diaphragm. These four piezoresistive elements are electrically connected to each other so as to constitute a Wheatstone bridge circuit. A pressure which is applied to the diaphragm is detected on the basis of an output of the Wheatstone bridge circuit.

However, in the pressure sensor disclosed in JP-A-2006-3099, since a pressure is detected using only the outputs of the piezoresistive elements which are provided in a single diaphragm, there is a problem that a S/Na signal to noise (S/N) ratio decreases with a reduction in size. This results from the following reason. That is, a reduction in the size of the diaphragm gives rise to a reduction in the area of a portion which is distorted by the pressure reception of the diaphragm, and sensitivity (signal) is reduced even when the area of the piezoresistive element is increased. When the area of the piezoresistive element is also reduced in conformity with the portion which is distorted by the pressure reception of the diaphragm, 1/f noise increases.

SUMMARY

An advantage of some aspects of the invention is to provide a physical quantity sensor which is capable of improving a S/N ratio even when a reduction in size is achieved, and to provide a pressure sensor, an altimeter, an electronic apparatus and a moving object which include the physical quantity sensor.

The invention can be implemented as the following forms or application examples.

Application Example 1

A physical quantity sensor according to this application example of the invention includes a plurality of diaphragm portions which are bent and deformed due to pressure reception, and a plurality of piezoresistive elements which are disposed in diaphragm portions at different locations from each other, and are electrically connected to each other in series.

According to such a physical quantity sensor, even when an area per piezoresistive element decreases with a reduction in size, the area can be increased by the total of a plurality of piezoresistive elements which are connected to each other in series. Therefore, it is possible to enhance the sensitivity of pressure reception while reducing 1/f noise. Therefore, even when a reduction in size is achieved, it is possible to improve a S/N ratio.

Application Example 2

In the physical quantity sensor according to the application example of the invention, it is preferable that the physical quantity sensor further includes a bridge circuit which is configured to include the plurality of piezoresistive elements.

With this configuration, it is possible to extract a high-accuracy signal depending on a pressure from a plurality of piezoresistive elements which are connected to each other in series with a relatively simple configuration.

Application Example 3

In the physical quantity sensor according to the application example of the invention, it is preferable that the number of diaphragm portions is two.

With this configuration, it is possible to improve a S/N ratio with a relatively simple and small-sized configuration.

Application Example 4

In the physical quantity sensor according to the application example of the invention, it is preferable that the number of diaphragm portions is four.

With this configuration, it is possible to improve a S/N ratio with a relatively simple and small-sized configuration.

Application Example 5

In the physical quantity sensor according to the application example of the invention, it is preferable that the physical quantity sensor further includes a plurality of reference pressure chambers.

With this configuration, since a wall portion of the reference pressure chamber is formed for each diaphragm, it is possible to enhance the mechanical strength of the physical quantity sensor. As a result, it is possible to enhance the reliability of the physical quantity sensor.

Application Example 6

In the physical quantity sensor according to the application example of the invention, it is preferable that the physical quantity sensor further includes a reference pressure chamber which is common to the plurality of diaphragm portions.

With this configuration, each diaphragm portion is bent and deformed on the basis of a common pressure. As a result, the design of the physical quantity sensor is facilitated.

Application Example 7

In the physical quantity sensor according to the application example of the invention, it is preferable that the reference pressure chamber is formed using a semiconductor manufacturing process.

With this configuration, it is possible to manufacture a small-sized physical quantity sensor simply and with a high degree of accuracy.

Application Example 8

In the physical quantity sensor according to the application example of the invention, it is preferable that the piezoresistive elements are disposed at an outer circumferential portion of the diaphragm portion and a portion which is located closer to a center side than to the outer circumferential portion, respectively.

With this configuration, the piezoresistive elements are disposed, with no waste, at a portion in which a strain occurs due to the pressure reception of the diaphragm portion, and thus it is possible to increase the total area of the piezoresistive elements. As a result, it is possible to further enhance a S/N ratio.

Application Example 9

A pressure sensor according to this application example of the invention includes the physical quantity sensor according to the application example of the invention.

With this configuration, it is possible to provide a pressure sensor including a physical quantity sensor which is small-sized and has an excellent S/N ratio.

Application Example 10

An altimeter according to this application example of the invention includes the physical quantity sensor according to the application example of the invention.

With this configuration, it is possible to provide an altimeter including a physical quantity sensor which is small-sized and has an excellent S/N ratio.

Application Example 11

An electronic apparatus according to this application example of the invention includes the physical quantity sensor according to the application example of the invention.

With this configuration, it is provided an electronic apparatus including a physical quantity sensor which is small-sized and has an excellent S/N ratio.

Application Example 12

A moving object according to this application example of the invention includes the physical quantity sensor according to the application example of the invention.

With this configuration, it is possible to provide a moving object including a physical quantity sensor which is small-sized and has an excellent S/N ratio.

BRIEF DESCRIPTION OF THE DRAWINGS

Embodiments of the invention will be described with reference to the accompanying drawings, wherein like numbers reference like elements.

FIG. 5A is a cross-sectional view illustrating a pressurized state, and FIG. 5B is a plan view illustrating the pressurized state.

DESCRIPTION OF EXEMPLARY EMBODIMENTS

Hereinafter, a physical quantity sensor, a pressure sensor, an altimeter, an electronic apparatus and a moving object according to the invention will be described in detail on the basis of each embodiment shown in the accompanying drawings.

First Embodiment

1. Physical Quantity Sensor

Figure 1:
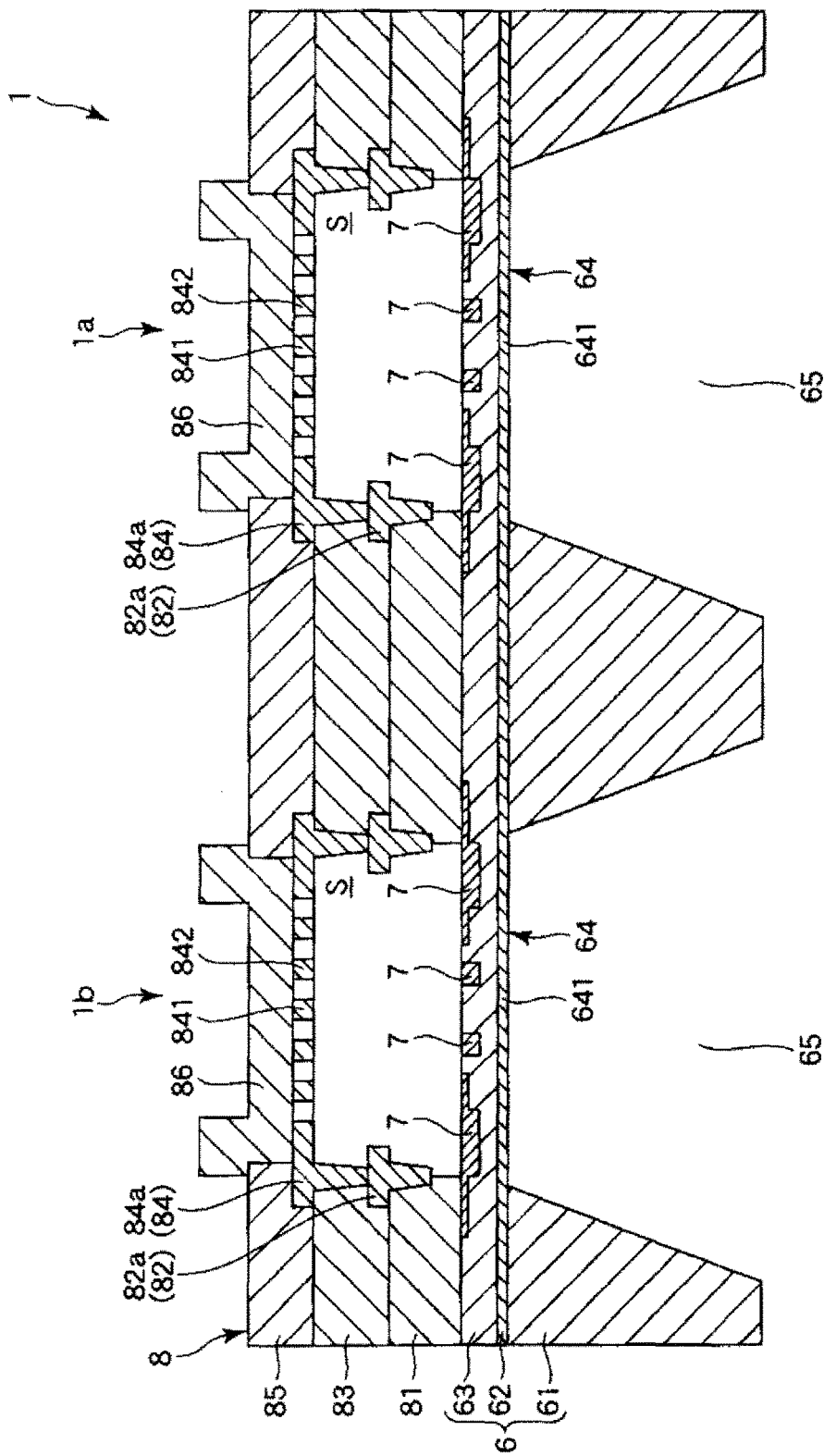
FIG. 1 is a cross-sectional view illustrating a physical quantity sensor according to a first embodiment of the invention.
Figure 2:
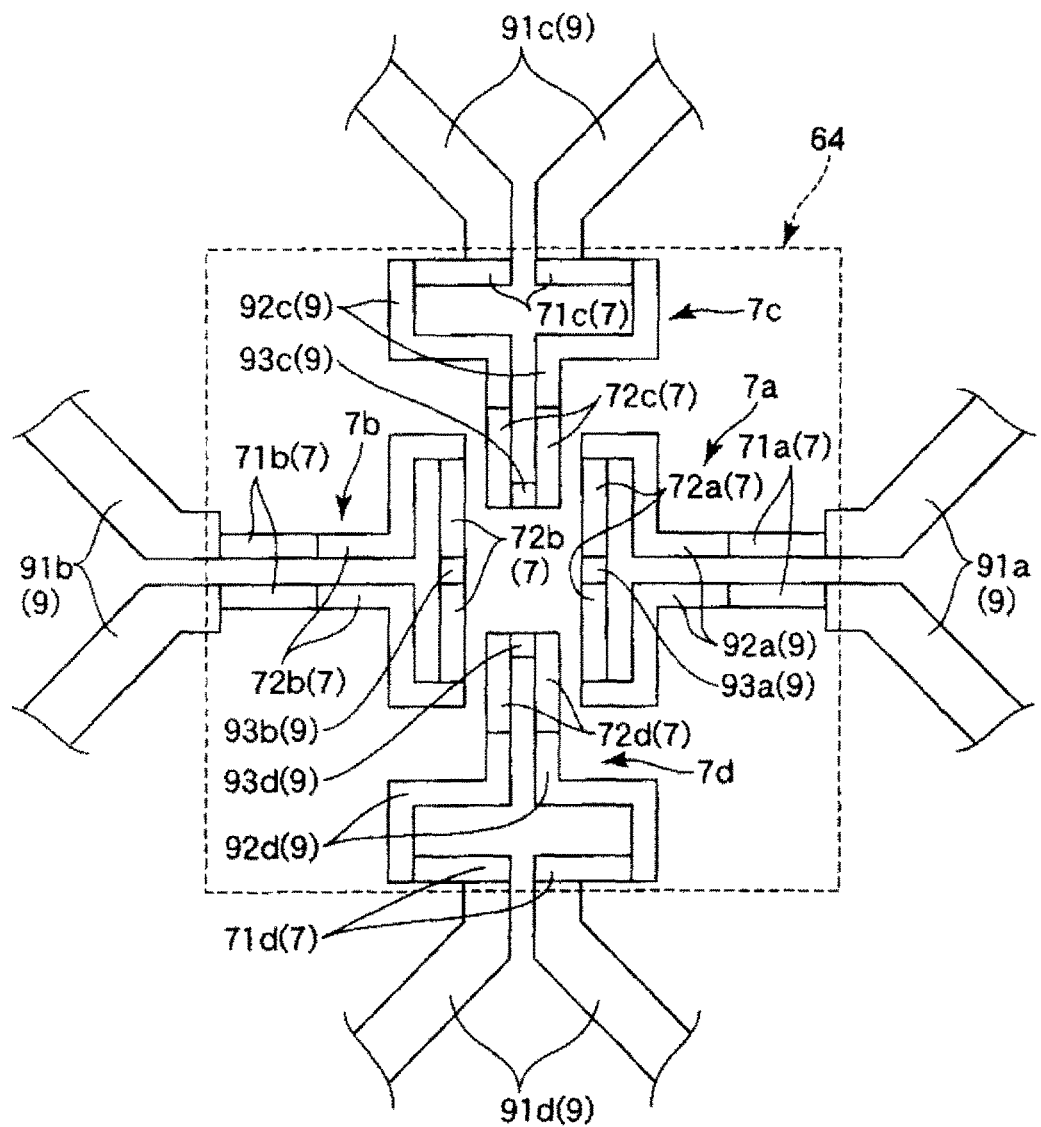
FIG. 2 is an enlarged plan view illustrating the arrangement of piezoresistive elements of the physical quantity sensor shown in FIG. 1.
Figure 3:
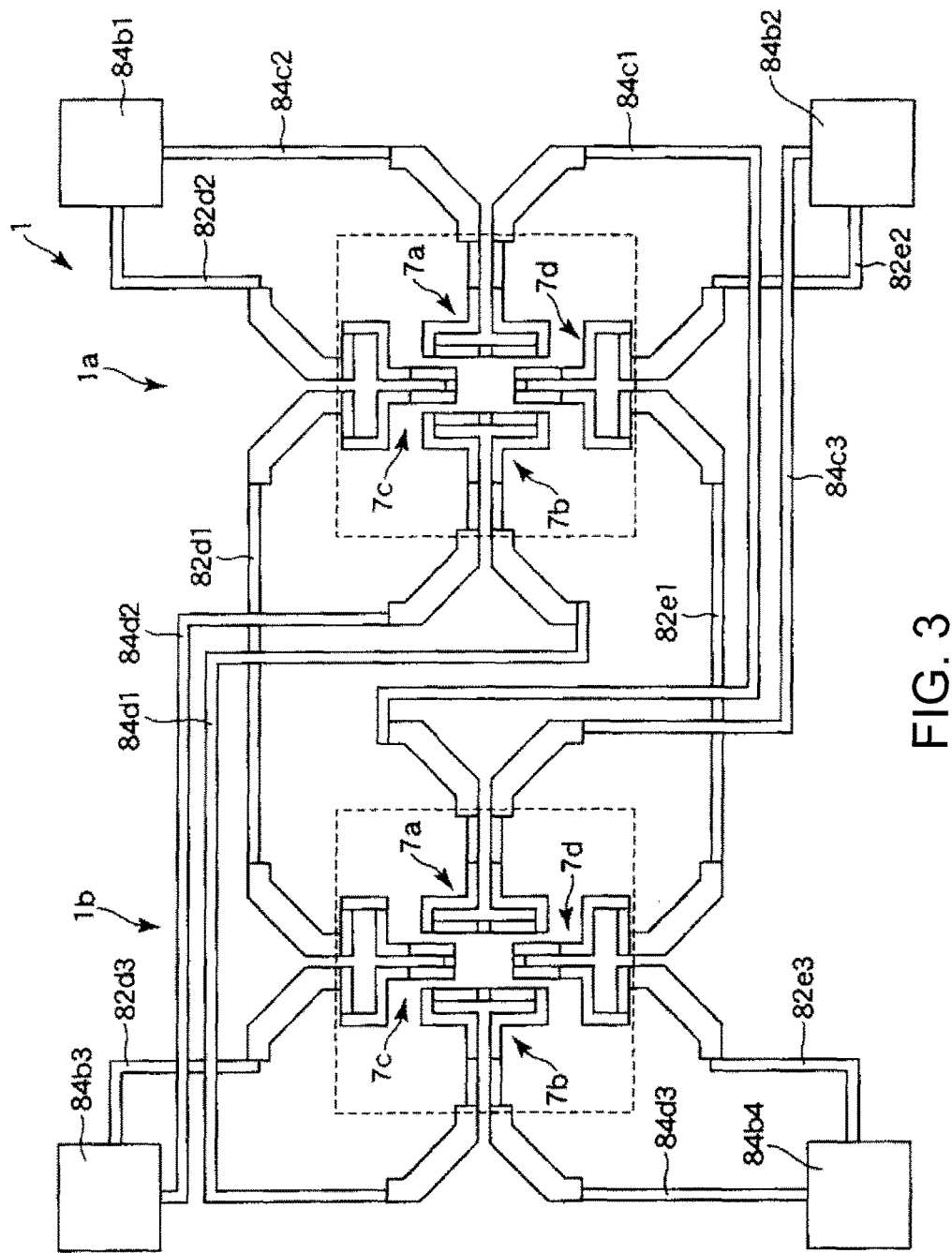
FIG. 3 is a plan view illustrating the arrangement of wirings to which the piezoresistive elements of the physical quantity sensor shown in FIG. 1 are connected.
Figure 4:
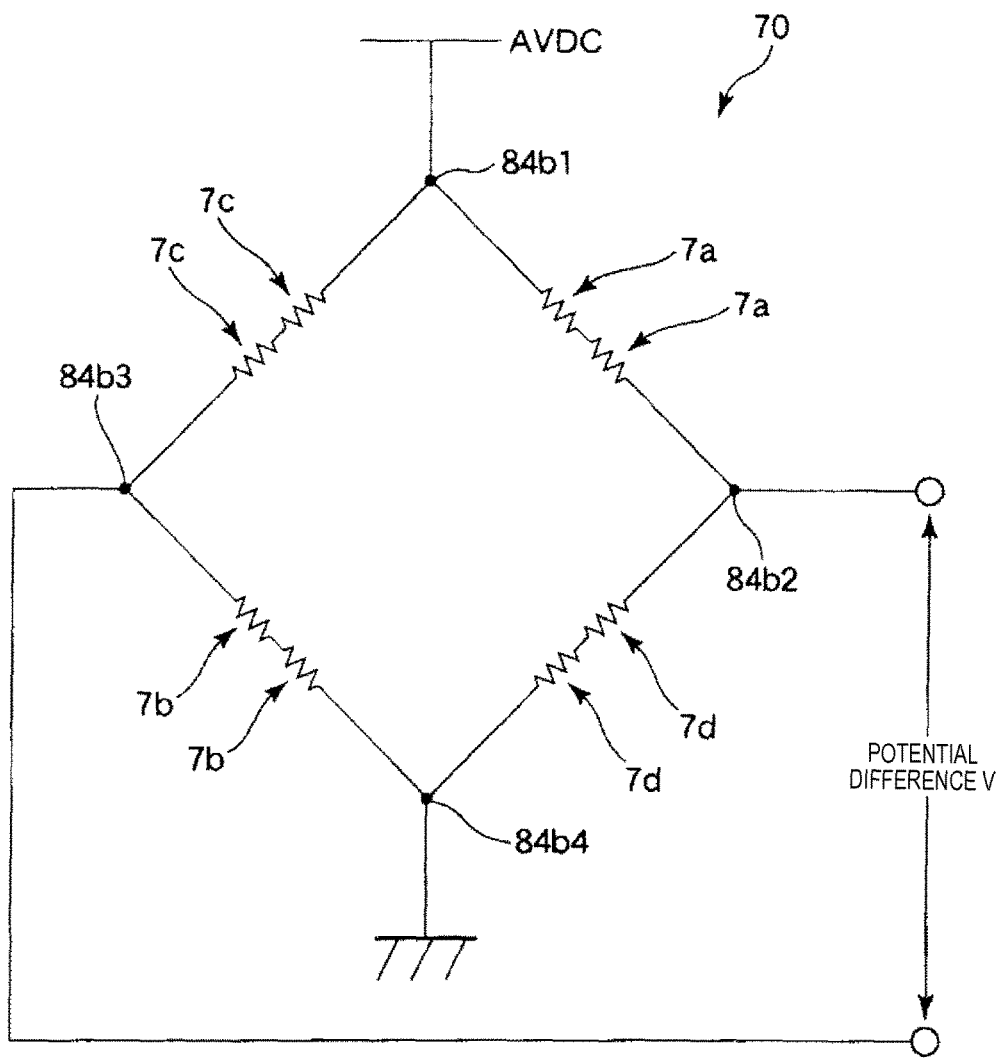
FIG. 4 is a diagram illustrating a bridge circuit including the piezoresistive elements included in the physical quantity sensor shown in FIG. 1.
Figure 5A:
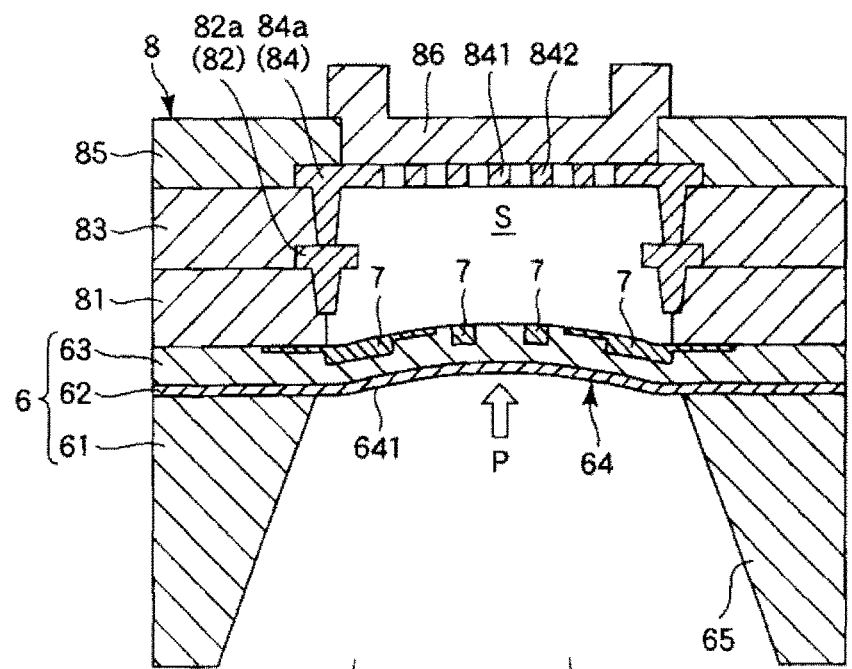
FIGS. 5A and 5B are diagrams illustrating actions of the physical quantity sensor shown in FIG. 1.
Figure 5B:
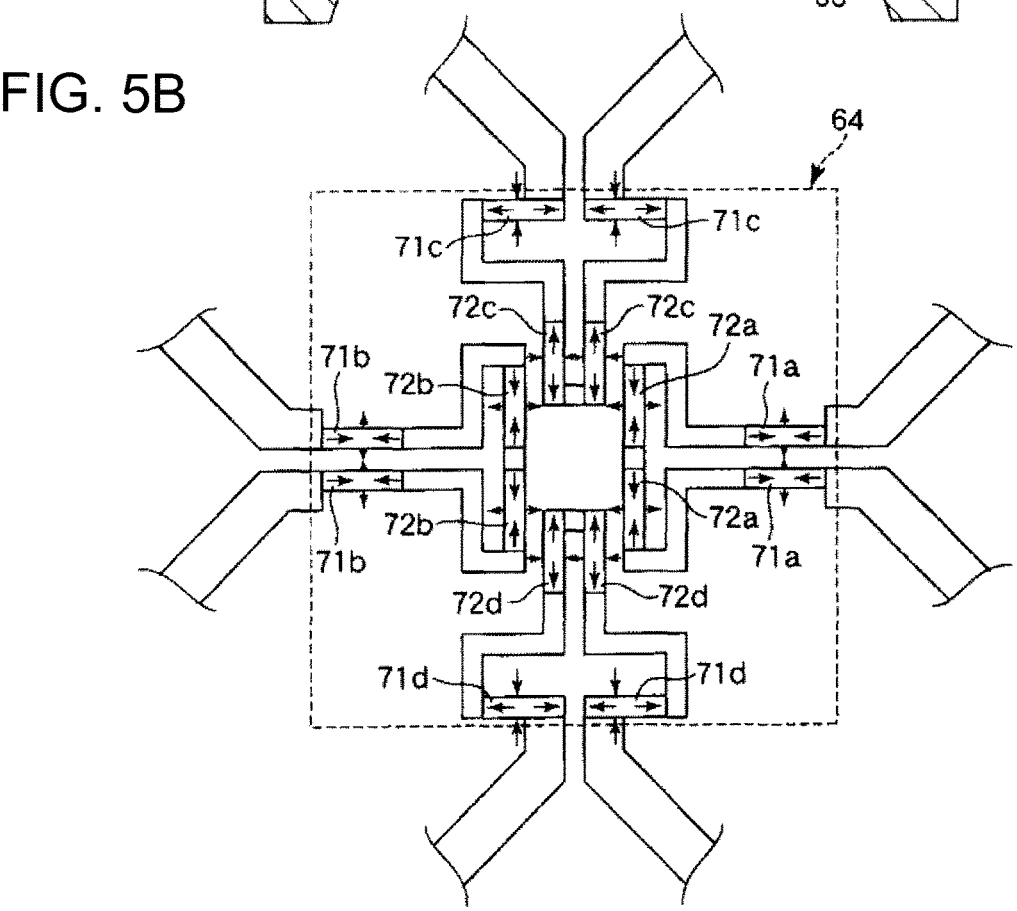

FIG. 1 is a cross-sectional view illustrating a physical quantity sensor according to a first embodiment of the invention, and FIG. 2 is an enlarged plan view illustrating the arrangement of piezoresistive elements of the physical quantity sensor shown in FIG. 1. In addition, FIG. 3 is a plan view illustrating the arrangement of wirings to which the piezoresistive elements of the physical quantity sensor shown in FIG. 1 are connected, and FIG. 4 is a diagram illustrating a bridge circuit including the piezoresistive elements included in the physical quantity sensor shown in FIG. 1. In addition, FIGS. 5A and 5B are diagrams illustrating actions of the physical quantity sensor shown in FIG. 1; FIG. 5A is a cross-sectional view illustrating a pressurized state, and FIG. 5B is a plan view illustrating the pressurized state. Hereinafter, for convenience of description, an upper side in FIG. 1 is defined as "upper", and a lower side is defined as "lower".

A physical quantity sensor 1 shown in FIG. 1 includes a substrate 6 and a laminated structure 8 which is provided on the upper surface of the substrate 6. Here, the substrate 6 includes a plurality of (in the present embodiment, two) diaphragm portions 64, and a plurality of piezoresistive elements 7 are formed in each of the diaphragm portions 64. In addition, the laminated structure 8 is configured such that a portion corresponding to each of the diaphragm portions 64 is separated from the substrate 6, and that a hollow portion S (reference pressure chamber) is thus formed between such a portion and the substrate 6. The physical quantity sensor 1 can be said to include two units 1a and 1b for each diaphragm portion 64.

Hereinafter, respective portions constituting the physical quantity sensor 1 will be sequentially described.

Substrate 6

The substrate 6 is an SOI substrate in which a silicon layer 61 (handle layer) formed of single crystal silicon, a silicon oxide layer 62 (box layer) formed of a silicon oxide film, and a silicon layer 63 (device layer) formed of single crystal silicon are laminated in this order. The substrate 6 is not limited to the SOI substrate, and may be, for example, other semiconductor substrates such as a single crystal silicon substrate.

In addition, the substrate 6 is provided with the diaphragm portions 64 which are thinner-walled than its surrounding portions, and are bent and deformed by pressure reception. Each diaphragm portion 64 is formed by providing a bottomed concave portion 65 (an opening) in the lower surface of the substrate 6. The diaphragm portion 64 is configured such that the lower surface thereof serves as a pressure receiving surface 641. In the present embodiment, as shown in FIG. 2, the diaphragm portion 64 is square in shape when seen in plan view.

In the substrate 6 of the present embodiment, the concave portion 65 passes through the silicon layer 61, and the diaphragm portion 64 is constituted by two layers of the silicon oxide layer 62 and the silicon layer 63. Here, as described later, the silicon oxide layer 62 can be used as an etching stop layer when the concave portion 65 is formed by etching in a process of manufacturing the physical quantity sensor 1, and can reduce a variation for each product having the thickness of the diaphragm portion 64.

The concave portion 65 may not pass through the silicon layer 61, and the diaphragm portion 64 may be constituted by three layers of a thin-walled portion of the silicon layer 61, the silicon oxide layer 62 and the silicon layer 63.

Piezoresistive Element 7

As shown in FIG. 1, the plurality of piezoresistive elements 7 are formed in the surface of the diaphragm portion 64 facing the hollow portion S. Here, although not shown in the drawing, a silicon oxide film and a silicon nitride film are laminated in this order on the piezoresistive element 7. The silicon oxide film and the silicon nitride film function as insulating films, respectively. In addition, the silicon nitride film also functions as an etching stop layer when the hollow portion S is formed in a process of manufacturing the physical quantity sensor 1 described later. The silicon oxide film and the silicon nitride film may be provided as desired, and may be omitted.

As shown in FIG. 2, the plurality of piezoresistive elements 7 are constituted by a plurality of piezoresistive elements 71a, 71b, 71c, 71d, 72a, 72b, 72c, and 72d.

The piezoresistive elements 71a and 72a, the piezoresistive elements 71b and 72b, the piezoresistive elements 71c and 72c, and the piezoresistive elements 71d and 72d are disposed, respectively, corresponding to four sides of the diaphragm portion 64 which is quadrilateral in shape when seen in plan view. Here, the four sides of the diaphragm portion 64 which is quadrilateral in shape when seen in plan view are constituted by a pair of sides facing each other side by side in a horizontal direction in FIG. 2 and a pair of sides facing each other side by side in a vertical direction in FIG. 2. When the diaphragm portion 64 which is quadrilateral in shape when seen in plan view is divided into the top, bottom, left and right in FIG. 2, the piezoresistive elements 71a and 72a are disposed at a right-side portion in FIG. 2, the piezoresistive elements 71b and 72b are disposed at a left-side portion in FIG. 2 so as to be symmetrical to the right-side portion, the piezoresistive elements 71c and 72c are disposed at an upper-side portion in FIG. 2, and the piezoresistive elements 71d and 72d are disposed at a lower-side portion in FIG. 2 so as to be symmetrical to the upper-side portion.

A pair of piezoresistive elements 71a are disposed at the outer circumferential portion of the diaphragm portion 64, and extend along a direction perpendicular to the corresponding side of the diaphragm portion 64. In addition, a pair of piezoresistive elements 72a are disposed further inward than the piezoresistive elements 71a of the diaphragm portion 64, and extend along a direction parallel to the corresponding side of the diaphragm portion 64. The pair of piezoresistive elements 71a and the pair of piezoresistive elements 72a are electrically connected to each other in series by wirings 92a and 93a, and are extracted outside by a wiring 91a.

Similarly, a pair of piezoresistive elements 71b are disposed at the outer circumferential portion of the diaphragm portion 64, and extend along a direction perpendicular to the corresponding side of the diaphragm portion 64. In addition, a pair of piezoresistive elements 72b are disposed further inward than the piezoresistive elements 71b of the diaphragm portion 64, and extend along a direction parallel to the corresponding side of the diaphragm portion 64. The pair of piezoresistive elements 71b and the pair of piezoresistive elements 72b are electrically connected to each other in series by wirings 92b and 93b, and are extracted outside by a wiring 91b.

On the other hand, a pair of piezoresistive elements 71c are disposed at the outer circumferential portion of the diaphragm portion 64, and extend along a direction parallel to the corresponding side of the diaphragm portion 64. In addition, a pair of piezoresistive elements 72c are disposed further inward than the piezoresistive elements 71c of the diaphragm portion 64, and extend along a direction perpendicular to the corresponding side of the diaphragm portion 64. The pair of piezoresistive elements 71c and the pair of piezoresistive elements 72c are electrically connected to each other in series by wirings 92c and 93c, and are extracted outside by a wiring 91c.

Similarly, a pair of piezoresistive elements 71d are disposed at the outer circumferential portion of the diaphragm portion 64, and extend along a direction parallel to the corresponding side of the diaphragm portion 64. In addition, a pair of piezoresistive elements 72d are disposed further inward than the piezoresistive elements 71d of the diaphragm portion 64, and extend along a direction perpendicular to the corresponding side of the diaphragm portion 64. The pair of piezoresistive elements 71d and the pair of piezoresistive elements 72d are electrically connected to each other in series by wirings 92d, and 93d, and are extracted outside by a wiring 91d.

The aforementioned piezoresistive elements 71a and 72a are collectively called a "piezoresistive element 7a", the piezoresistive elements 71b and 72b are collectively called a "piezoresistive element 7b", the piezoresistive elements 71c and 72c are collectively called a "piezoresistive element 7c", and the piezoresistive elements 71d and 72d are collectively called a "piezoresistive element 7d". In addition, the wirings 91a, 91b, 91c, 91d, 92a, 92b, 92c, 92d, 93a, 93b, 93c, and 93d are collectively called a "wiring 9".

Such piezoresistive elements 7a, 7b, 7c, and 7d and the wiring 9 are formed of, for example, silicon (single crystal silicon) which is doped with an impurity such as phosphorus or boron (into which the impurity is diffused or implanted). Here, the impurity doping concentration in the wiring 9 is higher than the impurity doping concentration in the piezoresistive elements 7a, 7b, 7c, and 7d. The wiring 9 may be formed of a metal.

In addition, the piezoresistive elements 7a, 7b, 7c, and 7d are configured so that the resistance values thereof under natural conditions become equal to each other.

As shown in FIG. 3, the piezoresistive elements 7a, 7b, 7c, and 7d as described above are provided in each of the two units 1a and 1b described above, and constitute a bridge circuit 70 (Wheatstone bridge circuit) as shown in FIG. 4.

Specifically, as shown in FIG. 3, one of the ends of the piezoresistive element 7a in each of the units 1a and 1b is electrically connected to each other through a wiring 84c1, the other end of the piezoresistive element 7a in the unit 1a is electrically connected to an electrode 84b1 through a wiring 84c2, and the other end of the piezoresistive element 7a in the unit 1b is electrically connected to an electrode 84b2 through a wiring 84c3. Thereby, the piezoresistive element 7a in each of the units 1a and 1b is electrically connected in series to a pair of electrodes 84b1 and 84b2.

In addition, one of the ends of the piezoresistive element 7b in each of the units 1a and 1b is electrically connected to each other through a wiring 84d1, the other end of the piezoresistive element 7b in the unit 1a is electrically connected to an electrode 84b3 through a wiring 84d2, and the other end of the piezoresistive element 7b in the unit 1b is electrically connected to an electrode 84b4 through a wiring 84d3. Thereby, the piezoresistive element 7b in each of the units 1a and 1b is electrically connected in series to a pair of electrodes 84b3 and 84b4.

In addition, one of the ends of the piezoresistive element 7c in each of the units 1a and 1b is electrically connected to each other through a wiring 82d1, the other end of the piezoresistive element 7c in the unit 1a is electrically connected to the electrode 84b1 through a wiring 82d2, and the other end of the piezoresistive element 7c in the unit 1b is electrically connected to the electrode 84b3 through a wiring 82d3. Thereby, the piezoresistive element 7c in each of the units 1a and 1b is electrically connected in series to a pair of electrodes 84b1 and 84b3.

In addition, one of the ends of the piezoresistive element 7d in each of the units 1a and 1b is electrically connected to each other through a wiring 82e1, the other end of the piezoresistive element 7d in the unit 1a is electrically connected to the electrode 84b2 through a wiring 82e2, and the other end of the piezoresistive element 7d in the unit 1b is electrically connected to the electrode 84b4 through a wiring 82e3. Thereby, the piezoresistive element 7d in each of the units 1a and 1b is electrically connected in series to a pair of electrodes 84b2 and 84b4.

In this manner, the piezoresistive elements 7a, 7b, 7c, and 7d in each of the units 1a and 1b constitute the bridge circuit 70 shown in FIG. 4. A drive circuit (not shown) that supplies a drive voltage AVDC between a pair of electrodes 84b1 and 84b4 is connected to the bridge circuit 70. In the bridge circuit 70, a potential difference between a pair of electrodes 84b2 and 84b3 is output as a signal (voltage) depending on the resistance values of the piezoresistive elements 7a, 7b, 7c, and 7d.

Laminated Structure 8

The laminated structure 8 is formed so as to form the hollow portion S in which the piezoresistive elements 7 are disposed. Here, the laminated structure 8 constitutes a "wall portion" which is disposed on one surface side of the silicon layer 61 and which forms the hollow portion S together with the diaphragm portion 64.

This laminated structure 8 includes an interlayer dielectric film 81 which is formed on the substrate 6 so as to surround the piezoresistive elements 7, a wiring layer 82 which is formed on the interlayer dielectric film 81, an interlayer dielectric film 83 which is formed on the wiring layer 82 and the interlayer dielectric film 81, a wiring layer 84, formed on the interlayer dielectric film 83, which has a coating layer 841 with a plurality of fine holes (openings), a surface protective film 85 which is formed on the wiring layer 84 and the interlayer dielectric film 83, and a sealing layer 86 which is provided on the coating layer 841.

Here, the wiring layer 82 includes a wiring layer 82a which is formed so as to surround the hollow portion S, and the aforementioned wirings 82d1 to 82d3 and 82e1 to 82e3. In addition, the wiring layer 84 includes a wiring layer 84a which is formed so as to surround the hollow portion S, the electrodes 84b1 to 84b4, and the wirings 84c1 to 84c3 and 84d1 to 84d3 mentioned above.

The laminated structure 8 can be formed using a semiconductor process such as a CMOS process. A semiconductor circuit may be formed on and above the silicon layer 61. This semiconductor circuit has active elements such as a MOS transistor, and circuit elements such as a capacitor, an inductor, a resistor, a diode, and a wiring (including a wiring which is connected to the piezoresistive element 7) which are formed as desired in addition thereto.

Hollow Portion S

The hollow portion S which is formed by the substrate 6 and the laminated structure 8 functions as a housing portion that houses the piezoresistive elements 7. In addition, the hollow portion S is a sealed space. This hollow portion S functions as a reference pressure chamber used for a reference value of pressure which is detected by the physical quantity sensor 1. In the present embodiment, the hollow portion S is in a vacuum state (300 Pa or lower). By the hollow portion S being made to be in a vacuum state, the physical quantity sensor 1 can be used as an "absolute pressure sensor" that detects a pressure on the basis of the vacuum state, and thus the convenience is improved.

Here, the hollow portion S may not be in a vacuum state, may be in an atmospheric pressure state, may be in a decompressed state where the air pressure is lower than the atmospheric pressure, and may be in a pressurized state where the air pressure is higher than the atmospheric pressure. In addition, an inert gas such as a nitrogen gas or a rare gas may be sealed in the hollow portion S.

As stated above, the configuration of the physical quantity sensor 1 has been described briefly.

In the physical quantity sensor 1 having such a configuration, as shown in FIG. 5A, the diaphragm portion 64 is deformed depending on the pressure which is received by the pressure reception surface 641 of the diaphragm portion 64. Thereby, as shown in FIG. 5B, the piezoresistive elements 7a, 7b, 7c, and 7d are distorted, and thus the resistance values of the piezoresistive elements 7a, 7b, 7c, and 7d are changed. Accordingly, an output of the bridge circuit 70 (see FIG. 4) which is constituted by the piezoresistive elements 7a, 7b, 7c, and 7d is changed, and the magnitude of the pressure which is received in the pressure receiving surface 641 can be obtained on the basis of the output.

More specifically, as described above, the resistance values of the piezoresistive elements 7a, 7b, 7c, and 7d are equal to each other. Therefore, under natural conditions before the diaphragm portion 64 is deformed as described above, the product of the resistance values of the piezoresistive elements 7a and 7b and the product of the resistance values of the piezoresistive elements 7c and 7d are equal to each other, and the output (potential difference) of the bridge circuit 70 is reduced to zero.

On the other hand, when the diaphragm portion 64 is deformed as described above, as shown in FIG. 5B, a compressive strain along a longitudinal direction and a tensile strain along a width direction occur in the piezoresistive elements 71a, 71b, 72a, and 72b, and a tensile strain along a longitudinal direction and a compressive strain along a width direction occur in the piezoresistive elements 71c, 71d, 72c, and 72d. Therefore, when the diaphragm portion 64 is deformed as described above, among the resistance value of the piezoresistive elements 7a and 7b and the resistance value of the piezoresistive elements 7c and 7d, one resistance value increases, and the other resistance value decreases.

A difference between the product of the resistance values of the piezoresistive elements 7a and 7b and the product of the resistance values of the piezoresistive elements 7c and 7d occurs due to such strains of the piezoresistive elements 71a, 71b, 71c, 71d, 72a, 72b, 72c, and 72d, an output (potential difference) depending on the difference being generated from the bridge circuit 70. The magnitude (absolute pressure) of the pressure which is received in the pressure receiving surface 641 can be obtained on the basis of the output from the bridge circuit 70.

Particularly, as described above, since the bridge circuit 70 is configured such that the piezoresistive element 7 of the unit 1a and the piezoresistive element 7 of the unit 1b are connected to each other in series, it is possible to obtain a large output from the bridge circuit 70.

In addition, when the diaphragm portion 64 is deformed as described above, among the resistance value of the piezoresistive elements 7a and 7b and the resistance value of the piezoresistive elements 7c and 7d, one resistance value increases, and the other resistance value decreases. Therefore, it is possible to increase a change in difference between the product of the resistance values of the piezoresistive elements 7a and 7b and the product of the resistance values of the piezoresistive elements 7c and 7d, and to increase an output from the bridge circuit 70 accordingly. As a result, it is possible to enhance the detection sensitivity of the pressure. In addition, since the temperature sensitivities of all the piezoresistive elements 7a, 7b, 7c, and 7d constituting the bridge circuit 70 are substantially the same as each other, it is also possible to reduce a change in characteristics with respect to an outside temperature change.

In the physical quantity sensor 1, the plurality of piezoresistive elements 7 are disposed in the diaphragm portions 64 at different locations from each other and are electrically connected to each other in series. Therefore, even when an area per piezoresistive element 7 is reduced with a reduction in size, the area can be increased by the total of the plurality of piezoresistive elements 7 which are connected to each other in series. Therefore, it is possible to enhance the sensitivity of pressure reception while reducing 1/f noise. Therefore, even when a reduction in size is achieved, it is possible to improve a S/N ratio.

In addition, since the bridge circuit 70 is configured to include the plurality of piezoresistive elements 7 which are connected to each other in series, it is possible to extract a high-accuracy signal depending on a pressure from the plurality of piezoresistive elements 7 which are connected to each other in series with a relatively simple configuration.

In addition, in the present embodiment, since the number of diaphragm portions 64 is two, it is possible to improve a S/N ratio with a relatively simple and small-sized configuration.

In addition, in the present embodiment, since the hollow portion S is formed independently for each diaphragm portion 64, and the wall portion of the hollow portion S is formed for each diaphragm portion 64, it is possible to enhance the mechanical strength of the physical quantity sensor 1. As a result, it is possible to enhance the reliability of the physical quantity sensor 1.

In addition, as described later, the hollow portion S is formed using a semiconductor manufacturing process. Thereby, it is possible to manufacture the small-sized physical quantity sensor 1 simply and with a high degree of accuracy.

In addition, since the piezoresistive elements 7 are disposed at the outer circumferential portion of the diaphragm portion 64 and a portion which is located closer to a center side than to the outer circumferential portion, respectively, the piezoresistive elements 7 are disposed, with no waste, at a portion in which a strain occurs due to the pressure reception of the diaphragm portion 64, and thus it is possible to increase the total area of the piezoresistive elements 7. As a result, it is possible to further enhance a S/N ratio.

Next, a method of manufacturing the physical quantity sensor 1 will be described briefly.

FIGS. 6A to 8 are diagrams illustrating processes of manufacturing the physical quantity sensor shown in FIG. 1. Hereinafter, a description will be given with reference to these drawings. Since the configurations of the units 1a and 1b are the same as each other, one unit will be described representatively in the following description, and only one unit is shown in the respective drawings.

Process of Forming Sensor Element

Figure 6A:
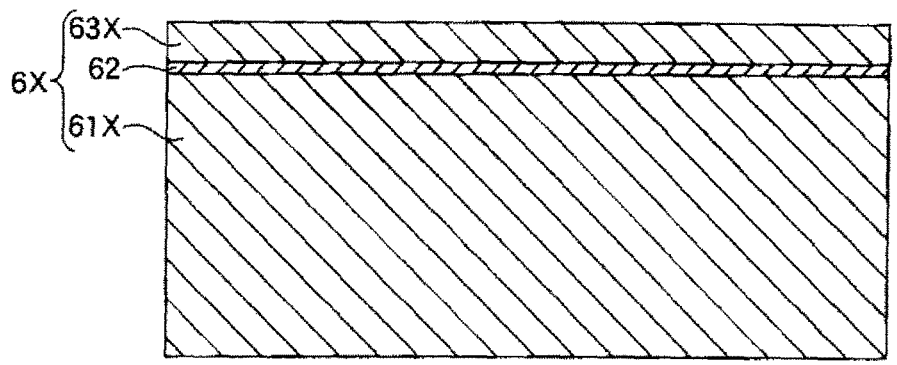
FIGS. 6A to 6C are diagrams illustrating a process of manufacturing the physical quantity sensor shown in FIG. 1.

First, as shown in FIG. 6A, a substrate 6X which is an SOI substrate is prepared. This substrate 6X is configured such that a silicon layer 61X (handle layer) which is formed of single crystal silicon, a silicon oxide layer 62 (box layer) which is formed of a silicon oxide film, and a silicon layer 63X which is formed of single crystal silicon are laminated in this order. Here, after the silicon layer 61X is thin-walled by polishing or the like, as desired, in a subsequent process, the silicon layer has the concave portion 65 formed therein and serves as the silicon layer 61.

Figure 6B:
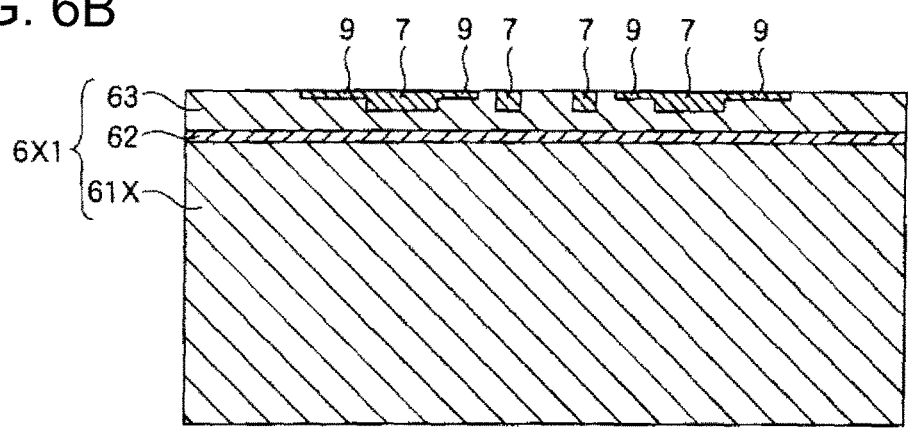

Next, as shown in FIG. 6B, the piezoresistive elements 7 and the wirings 9 are formed by doping the silicon layer 63X with an impurity such as phosphorus or boron (ion implantation). Thereby, the silicon layer 63 is obtained in which the piezoresistive elements 7 and the wirings 9 are formed.

In this ion implantation, ion implantation conditions or the like are adjusted so that the amount of an impurity with which the wiring 9 is doped becomes larger than that in the piezoresistive element 7.

For example, when the ion implantation of boron is performed at 17 keV, the concentration of ion implantation into the piezoresistive element 7 is set to be approximately equal to or greater than $1 \times 10^{13}$ atoms/cm$^2$ and equal to or less than $1 \times 10^{15}$ atoms/cm$^2$, and the concentration of ion implantation into the wiring 9 is set to be approximately equal to or greater than $1 \times 10^{15}$ atoms/cm$^2$ and equal to or less than $5 \times 10^{15}$ atoms/cm$^2$.

Process of Forming Interlayer Dielectric Film and Wiring Layer

Figure 6C:
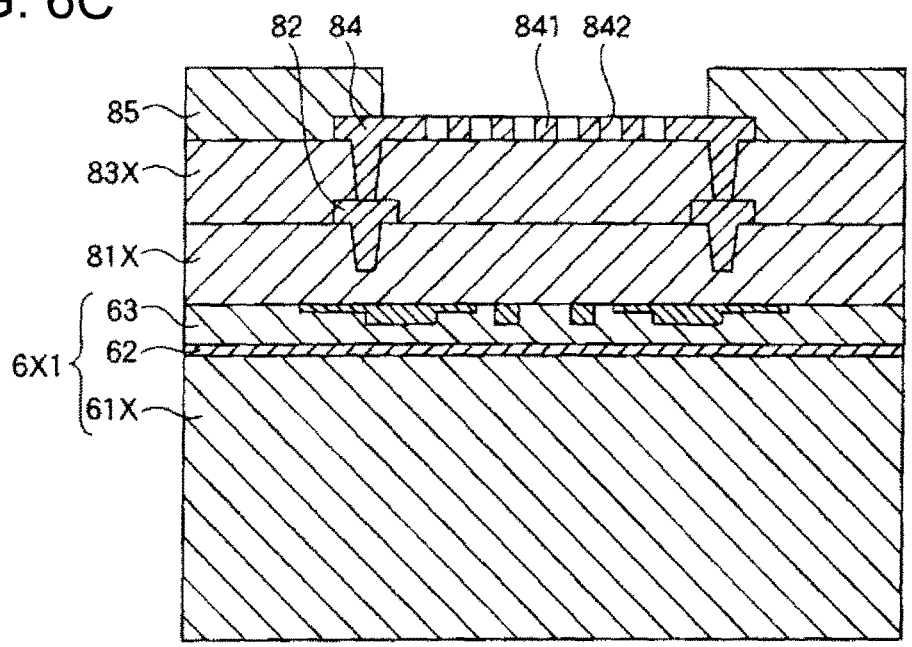

Next, as shown in FIG. 6C, interlayer dielectric films 81X and 83X, the wiring layers 82 and 84, and the surface protective film 85 are formed on the silicon layer 63.

The formation of the interlayer dielectric films 81X and 83X is performed by a silicon oxide film being formed by a sputtering method, a CVD method or the like, and the silicon oxide film being patterned using etching.

Here, the thickness of each of the interlayer dielectric films 81X and 83X is not particularly limited, and is set to be, for example, approximately equal to or greater than 1,500 nm and equal to or less than 5,000 nm.

In addition, the formation of the wiring layers 82 and 84 is performed by a layer which is formed of, for example, aluminum being formed on the interlayer dielectric films 81X and 83X by a sputtering method, a CVD method or the like, and then the layer being patterned.

Here, the thickness of each of the wiring layers 82 and 84 is not particularly limited, and is set to, for example, approximately equal to or greater than 300 nm and equal to or less than 900 nm.

The laminated structure of the interlayer dielectric films 81X and 83X and the wiring layers 82 and 84 is formed by a normal CMOS process, and the number of laminated layers is set appropriately as desired. That is, many more wiring layers may be laminated, as desired, with an interlayer dielectric film interposed therebetween.

After the interlayer dielectric films 81X and 83X and the wiring layers 82 and 84 are formed in this manner, the surface protective film 85 is formed by a sputtering method, a CVD method or the like. Configuration materials of the surface protective film 85 to be formed includes materials, having a tolerance, for protecting elements such as a silicon oxide film, a silicon nitride film, a polyimide film, and an epoxy resin film from moisture, dust, damage, or the like.

Here, the thickness of the surface protective film 85 is not particularly limited, and is set to be, for example, approximately equal to or greater than 500 nm and equal to or less than 2,000 nm.

Process of Forming Hollow Portion

Figure 7A:
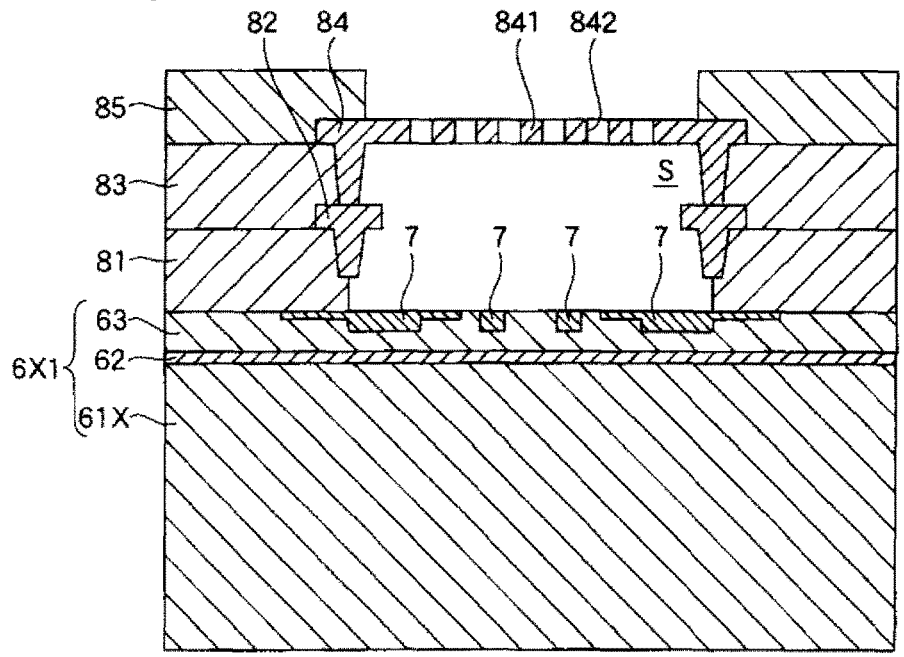
FIGS. 7A and 7B are diagrams illustrating a process of manufacturing the physical quantity sensor shown in FIG. 1.

Next, as shown in FIG. 7A, the hollow portion S is formed by etching. Thereby, a portion of the interlayer dielectric films 81X and 83X is removed, and the interlayer dielectric films 81 and 83 are formed.

The formation of the hollow portion S is performed by a portion of the interlayer dielectric films 83X and 85X being removed by etching through a plurality of fine holes 842 which is formed in the coating layer 841. Here, an etchant such as hydrofluoric acid or buffered hydrofluoric acid is supplied from a plurality of fine holes 842 when wet etching is used as such etching, and an etching gas such as a hydrofluoric acid gas is supplied from the plurality of fine holes 842 when dry etching is used as such etching.

Sealing Process

Figure 7B:
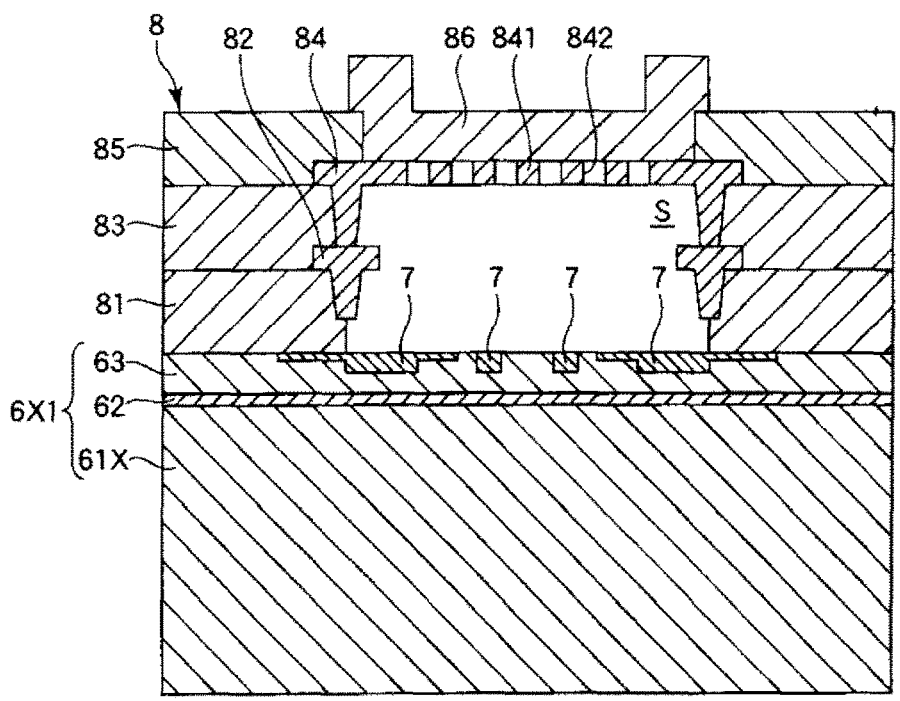

Next, as shown in FIG. 7B, the sealing layer 86 which is formed of a silicon oxide film, a silicon nitride film, a metal film such as AL, Cu, W, Ti, or TiN, or the like is formed on the coating layer 841 by a sputtering method, a CVD method or the like, and each of the fine holes 842 is sealed. Thereby, the hollow portion S is sealed by the sealing layer 86, and the laminated structure 8 is obtained.

Here, the thickness of the sealing layer 86 is not particularly limited, and is set to be, for example, approximately equal to or greater than 1,000 nm and equal to or less than 5,000 nm.

Process of Forming Diaphragm

Figure 8:
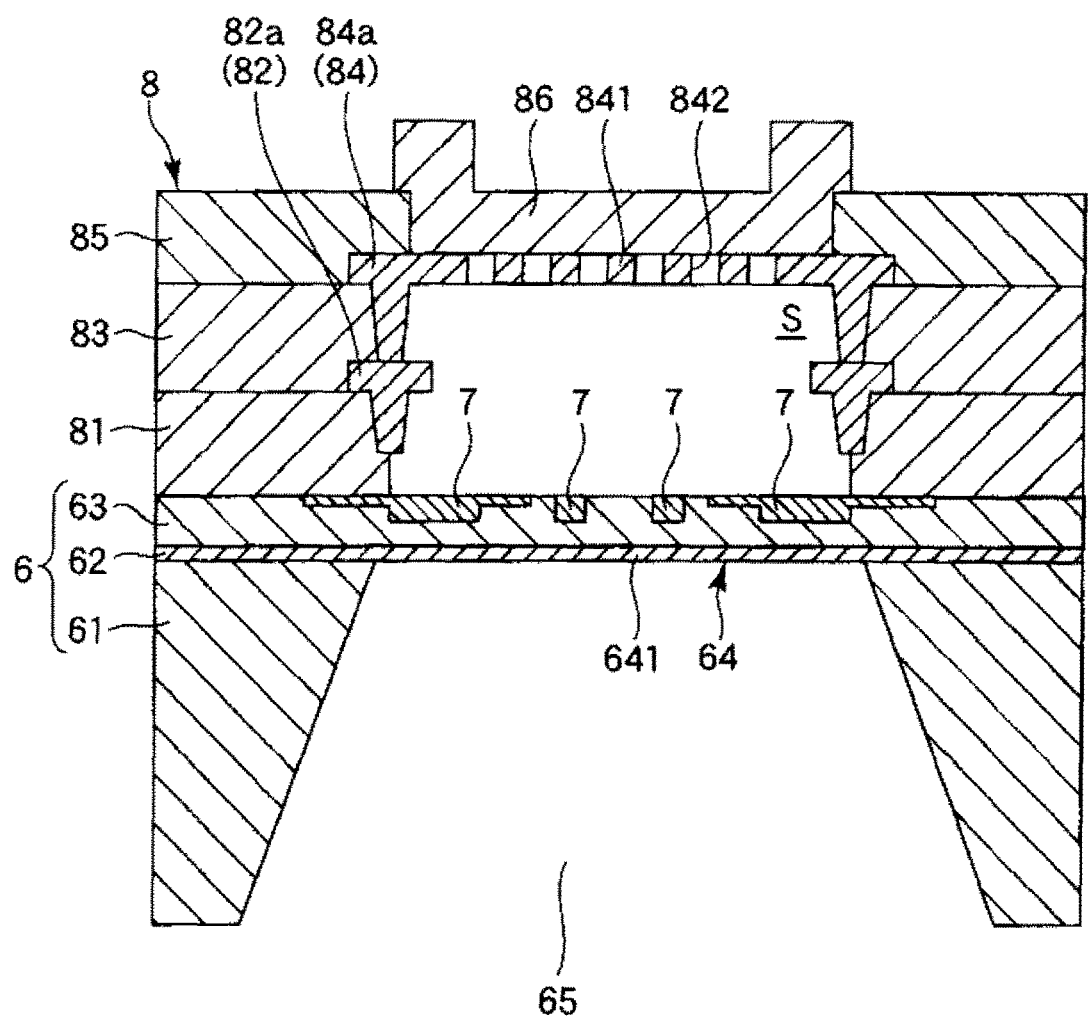
FIG. 8 is a diagram illustrating a process of manufacturing the physical quantity sensor shown in FIG. 1.

Next, the lower surface of the silicon layer 61X is ground as desired, and then a portion of the lower surface of the silicon layer 61X is removed by etching, and thus the concave portion 65 is formed as shown in FIG. 8. Thereby, the diaphragm portion 64 which is thinner-walled than the surroundings is formed.

Here, when a portion of the lower surface of the silicon layer 61X is removed, the silicon oxide layer 62 functions as an etching stop layer. Thereby, it is possible to control the thickness of the diaphragm portion 64 with a high degree of accuracy.

A method of removing a portion of the lower surface of the silicon layer 61X may include dry etching, and may include wet etching or the like.

It is possible to manufacture the physical quantity sensor 1 through such processes.

Second Embodiment

Next, a physical quantity sensor according to a second embodiment of the invention will be described.

Figure 9:
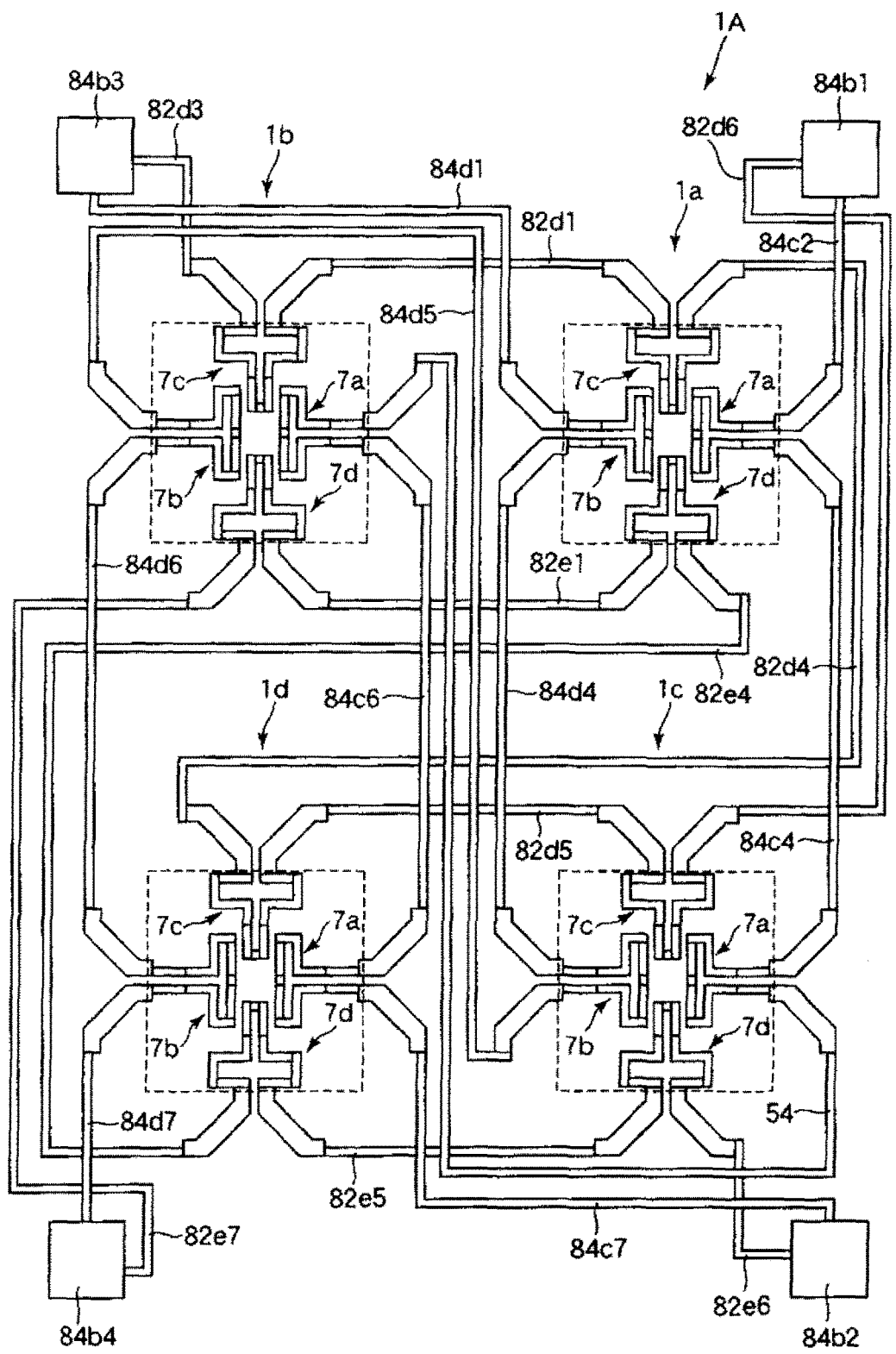
FIG. 9 is an enlarged plan view illustrating the arrangement of piezoresistive elements of a physical quantity sensor according to a second embodiment of the invention.
Figure 10:
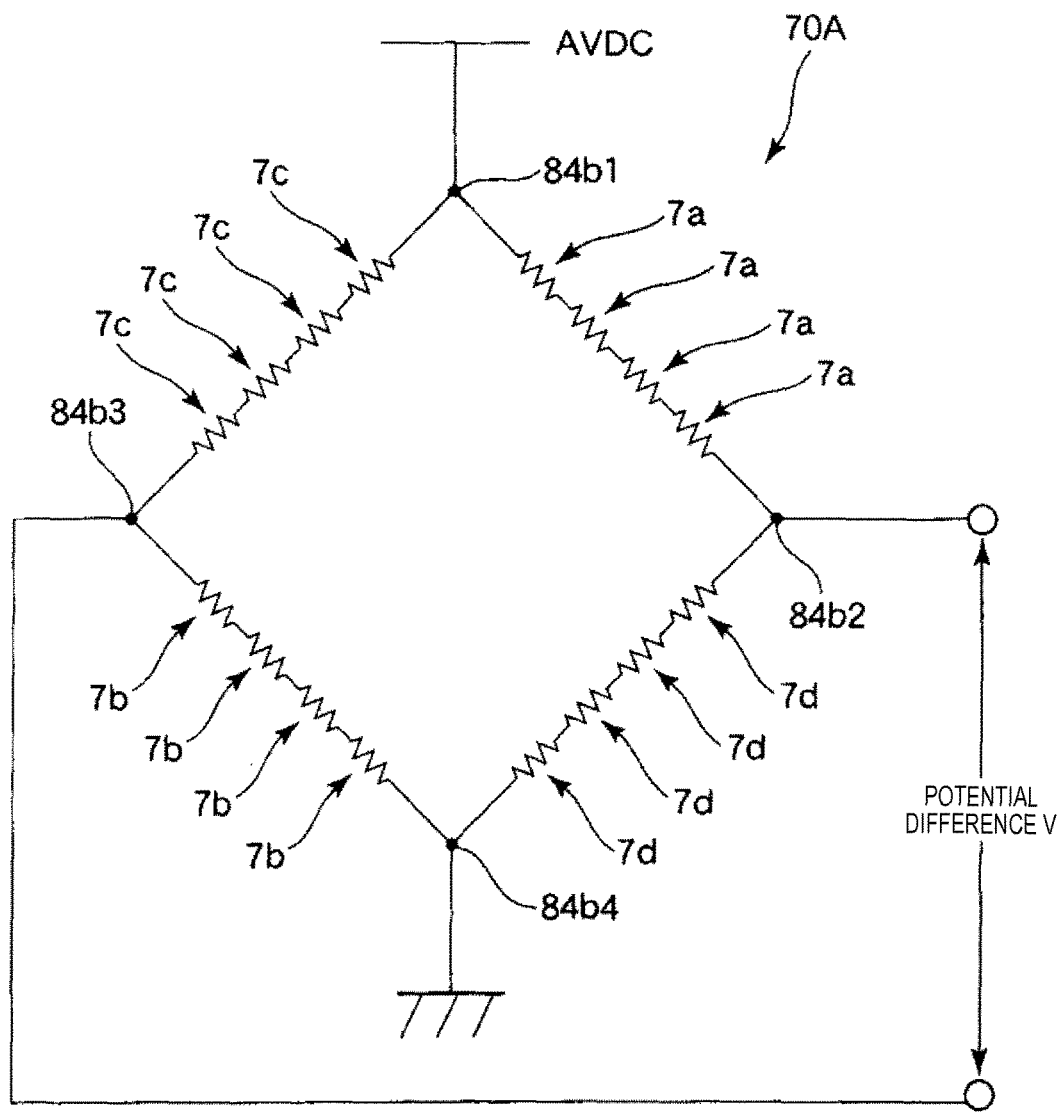
FIG. 10 is a diagram illustrating a bridge circuit including the piezoresistive elements included in the physical quantity sensor shown in FIG. 9.

FIG. 9 is an enlarged plan view illustrating the arrangement of piezoresistive elements of the physical quantity sensor according to the second embodiment of the invention, and FIG. 10 is a diagram illustrating a bridge circuit including the piezoresistive elements included in the physical quantity sensor shown in FIG. 9.

Hereinafter, the physical quantity sensor according to the second embodiment of the invention will be described, but a description will be given with focus on differences from the aforementioned embodiment, and common particulars will not be described below. In FIGS. 9 and 10, the same components as those of the aforementioned embodiment are denoted by the same reference numerals and signs.

The second embodiment is the same as the first embodiment, except that the number of units having a diaphragm and configurations associated therewith are different from the above.

A physical quantity sensor 1A shown in FIG. 9 includes four units 1a, 1b, 1c, and 1d having the piezoresistive elements 7a, 7b, 7c, and 7d.

The piezoresistive elements 7a, 7b, 7c, and 7d of the four units 1a, 1b, 1c, and 1d constitute a bridge circuit 70A (Wheatstone bridge circuit) as shown in FIG. 10.

Specifically, as shown in FIG. 9, the piezoresistive element 7a in each of the units 1a, 1b, 1c, and 1d is electrically connected in series to a pair of electrodes 84b1 and 84b2 by wirings 84c2, 84c4, 84c5, 84c6, and 84c7.

In addition, the piezoresistive element 7b in each of the units 1a, 1b, 1c, and 1d is electrically connected in series to a pair of electrodes 84b3 and 84b4 by wirings 84d1, 84d4, 84d5, 84d6, and 84d7.

In addition, the piezoresistive element 7c in each of the units 1a, 1b, 1c, and 1d is electrically connected in series to a pair of electrodes 84b1 and 84b3 by wirings 82d3, 82d1, 82d4, 82d5, and 82d6.

In addition, the piezoresistive element 7d in each of the units 1a, 1b, 1c, and 1d is electrically connected in series to a pair of electrodes 84b2 and 84b4 by wirings 82e7, 82e1, 82e4, 82e5, and 82e6.

In this manner, the piezoresistive elements 7a, 7b, 7c, and 7d in each of the units 1a, 1b, 1c, and 1d constitute the bridge circuit 70A shown in FIG. 10. A drive circuit (not shown) that supplies a drive voltage AVDC between a pair of electrodes 84b1 and 84b4 is connected to the bridge circuit 70A. In the bridge circuit 70A, a potential difference between a pair of electrodes 84b2 and 84b3 is output as a signal (voltage) depending on the resistance values of the piezoresistive elements 7a, 7b, 7c, and 7d.

In the physical quantity sensor 1A, since the number of diaphragm portions 64 is four, it is possible to improve a S/N ratio with a relatively simple and small-sized configuration.

Even when a reduction in size is achieved by the physical quantity sensor 1A as described above, it is possible to improve a S/N ratio.

Third Embodiment

Next, a physical quantity sensor according to a third embodiment of the invention will be described.

Figure 11:
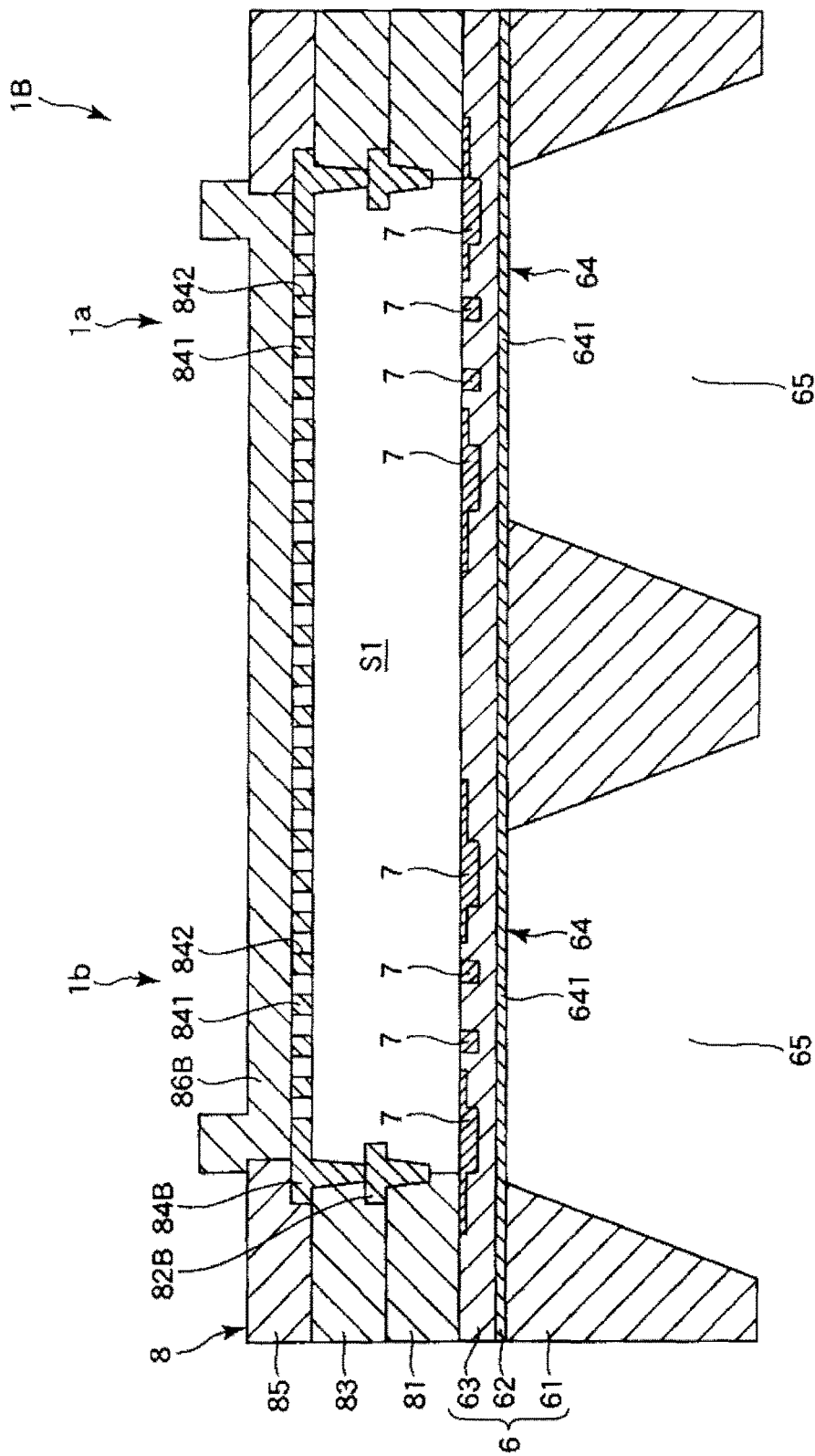
FIG. 11 is a cross-sectional view illustrating a physical quantity sensor according to a third embodiment of the invention.

FIG. 11 is a cross-sectional view illustrating the physical quantity sensor according to the third embodiment of the invention.

Hereinafter, the physical quantity sensor according to the third embodiment of the invention will be described, but a description will be given with focus on differences from the aforementioned embodiments, and common particulars will not be described below.

The third embodiment is the same as the first embodiment, except that the configuration of the hollow portion (reference pressure chamber) is different from the above.

A physical quantity sensor 1B shown in FIG. 11 includes a substrate 6 and a laminated structure 8B which is provided on the upper surface of the substrate 6. Here, the laminated structure 8B is configured such that not only portions corresponding to a plurality of diaphragm portions 64 included in the substrate 6 but also portions between these portions are separated from the substrate 6, and a hollow portion S1 (reference pressure chamber) is thus formed between such portions and the substrate 6.

This hollow portion S1 is provided in common to the diaphragm portion 64 of the unit 1a and the diaphragm portion 64 of the unit 1b. In other words, a reference pressure chamber for the diaphragm portion 64 of the unit 1a and a reference pressure chamber for the diaphragm portion 64 of the unit 1b communicate with each other, and thus the hollow portion S1 is formed.

In the physical quantity sensor 1B, since the hollow portion S is common to a plurality of diaphragm portions 64, each diaphragm portion 64 is bent and deformed on the basis of a common pressure. As a result, the design of the physical quantity sensor 1B is facilitated.

Even when a reduction in size is achieved by the physical quantity sensor 1B as described above, it is possible to improve a S/N ratio.

Fourth Embodiment

Next, a physical quantity sensor according to a fourth embodiment of the invention will be described.

Figure 12:
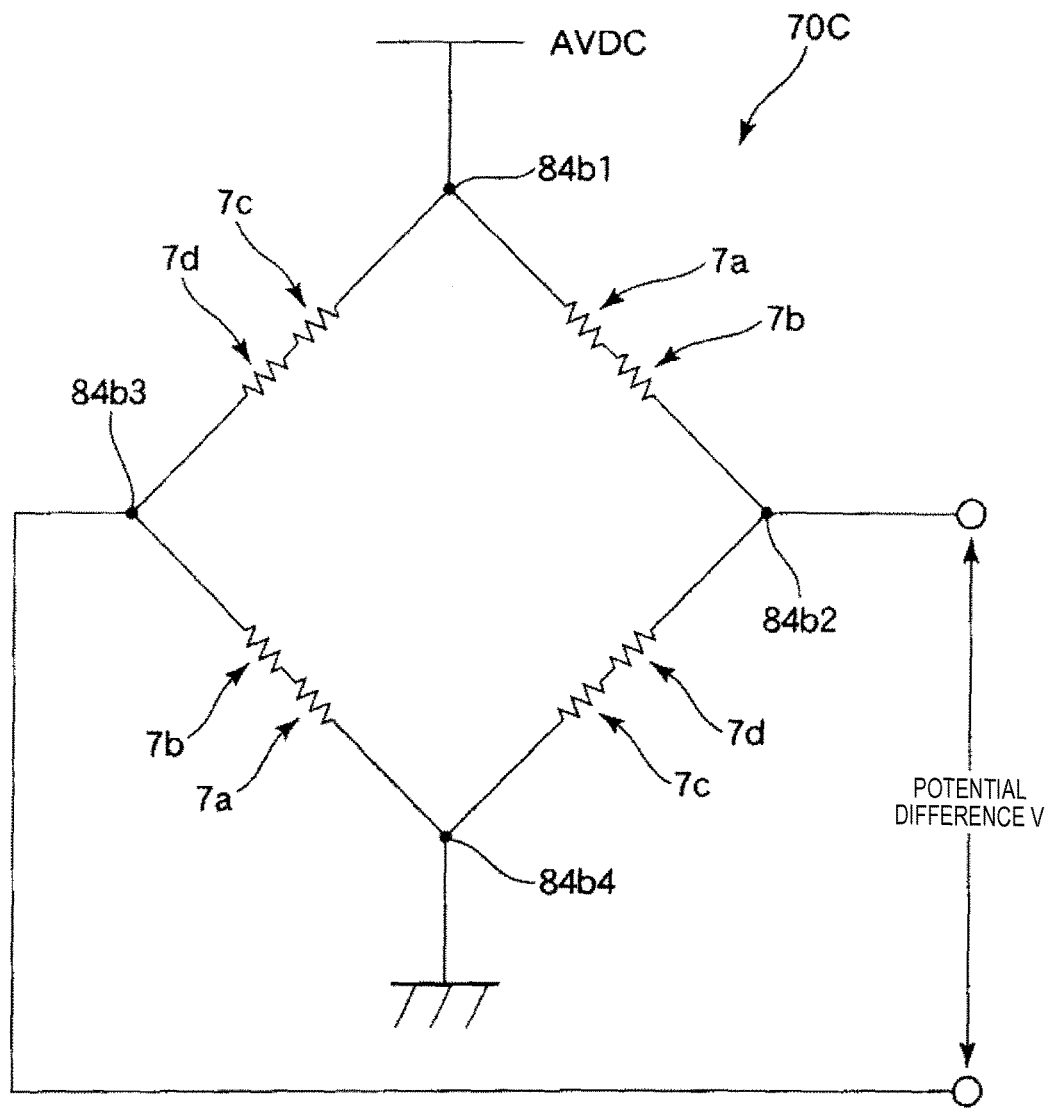
FIG. 12 is a diagram illustrating a bridge circuit including piezoresistive elements included in a physical quantity sensor according to a fourth embodiment of the invention.

FIG. 12 is a diagram illustrating a bridge circuit including piezoresistive elements included in the physical quantity sensor according to the fourth embodiment of the invention.

Hereinafter, the physical quantity sensor according to the fourth embodiment of the invention will be described, but a description will be given with focus on differences from the aforementioned embodiments, and common particulars will not be described below.

The fourth embodiment is the same as the first embodiment, except that the connection relation of the piezoresistive elements between the units is different from the above.

The physical quantity sensor of the present embodiment includes a bridge circuit 70C shown in FIG. 12.

In the bridge circuit 70C, the piezoresistive element 7a of the unit 1a and the piezoresistive element 7b of the unit 1b are electrically connected in series to a pair of electrodes 84b1 and 84b2.

In addition, the piezoresistive element 7b of the unit 1a and the piezoresistive element 7a of the unit 1b are electrically connected in series to a pair of electrodes 84b3 and 84b4.

In addition, the piezoresistive element 7c of the unit 1a and the piezoresistive element 7d of the unit 1b are electrically connected in series to a pair of electrodes 84b1 and 84b3.

In addition, the piezoresistive element 7d of the unit 1a and the piezoresistive element 7c of the unit 1b are electrically connected in series to a pair of electrodes 84b2 and 84b4.

Even when a reduction in size is achieved by the fourth embodiment as described above, it is possible to improve a S/N ratio.

Fifth Embodiment

Next, a physical quantity sensor according to a fifth embodiment of the invention will be described.

Figure 13:
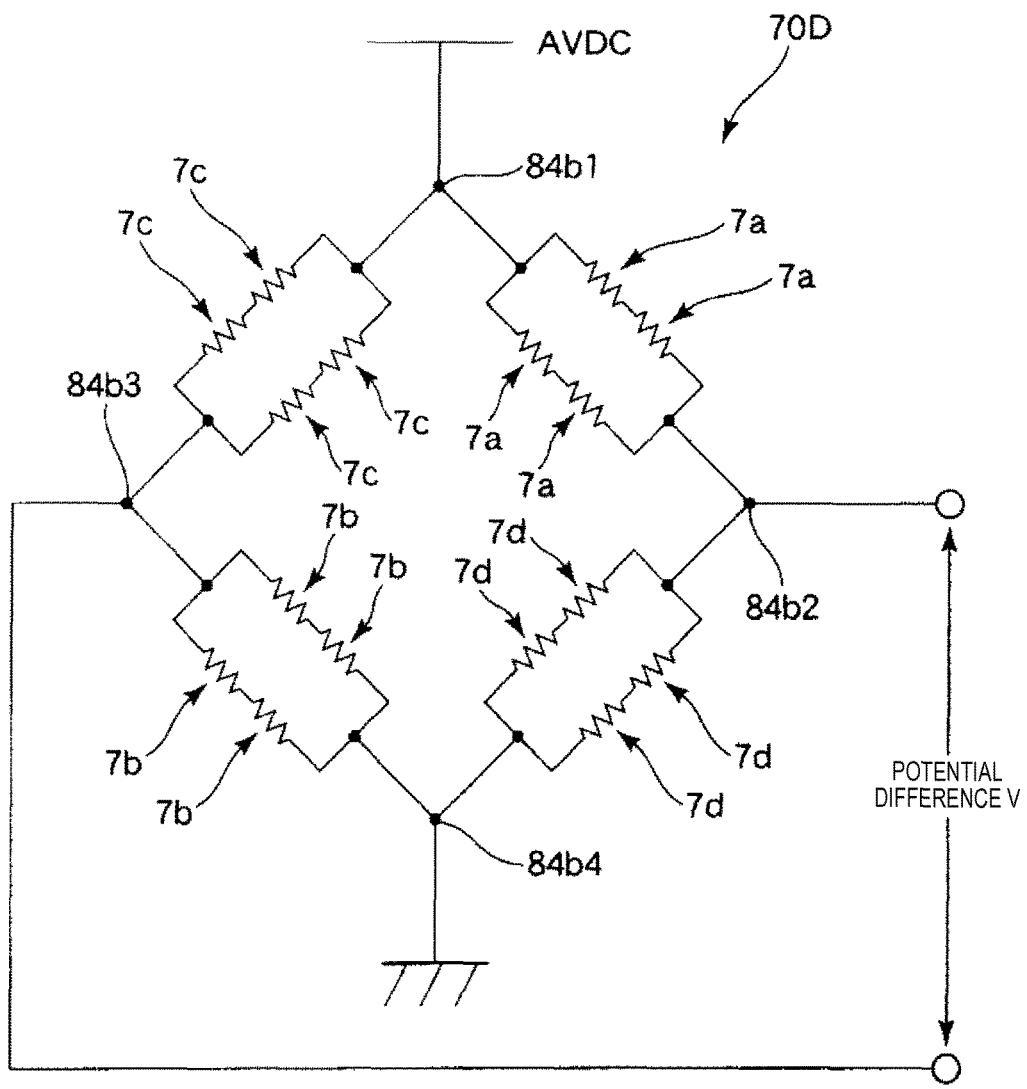
FIG. 13 is a diagram illustrating a bridge circuit including piezoresistive elements included in a physical quantity sensor according to a fifth embodiment of the invention.

FIG. 13 is a diagram illustrating a bridge circuit including piezoresistive elements included in the physical quantity sensor according to the fifth embodiment of the invention.

Hereinafter, the physical quantity sensor according to the fifth embodiment of the invention will be described, but a description will be given with focus on differences from the aforementioned embodiment, and common particulars will not be described below.

The fifth embodiment is the same as the second embodiment, except that the connection relation of the piezoresistive elements between the units is different from the above one.

The physical quantity sensor of the present embodiment includes a bridge circuit 70D shown in FIG. 13.

In the bridge circuit 70D, the piezoresistive element 7a in each of the units 1a, 1b, 1c, and 1d is electrically connected in series to a pair of electrodes 84b1 and 84b2 by division into two. That is, two piezoresistive elements 7a which are connected to each other in series form two sets, and these sets are electrically connected in parallel to a pair of electrodes 84b1 and 84b2.

In addition, the piezoresistive element 7b in each of the units 1a, 1b, 1c, and 1d is electrically connected in series to a pair of electrodes 84b3 and 84b4 by division into two.

In addition, the piezoresistive element 7c in each of the units 1a, 1b, 1c, and 1d is electrically connected in series to a pair of electrodes 84b1 and 84b3 by division into two.

In addition, the piezoresistive element 7d in each of the units 1a, 1b, 1c, and 1d is electrically connected in series to a pair of electrodes 84b2 and 84b4 by division into two.

Even when a reduction in size is achieved by the fifth embodiment as described above, it is possible to improve a S/N ratio.

2. Pressure Sensor

Figure 14:
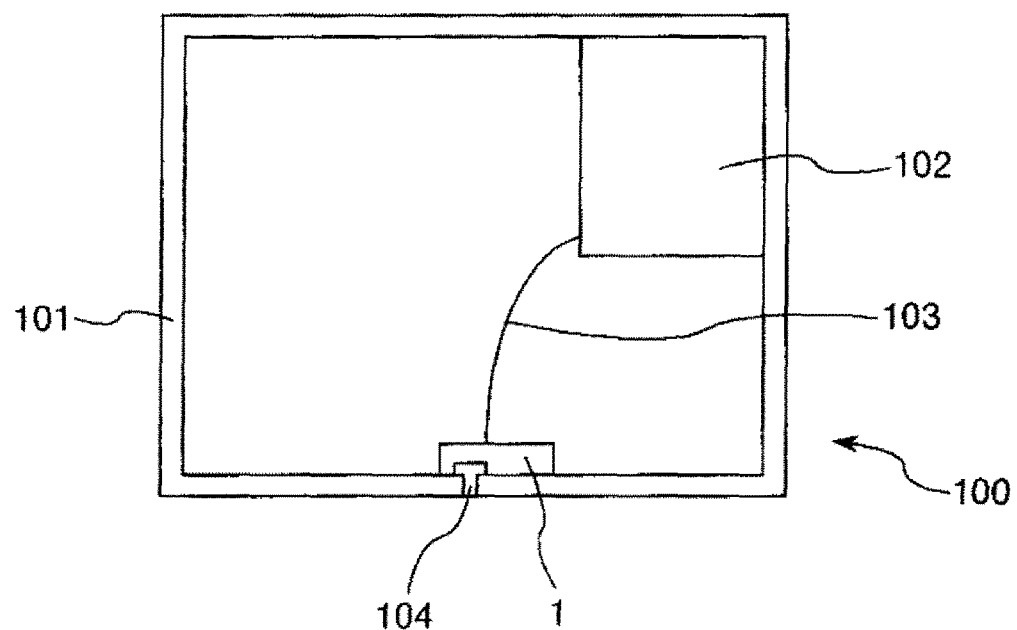
FIG. 14 is a cross-sectional view illustrating an example of a pressure sensor according to the invention.

Next, a pressure sensor (pressure sensor according to the invention) including the physical quantity sensor according to the invention will be described. FIG. 14 is a cross-sectional view illustrating an example of the pressure sensor according to the invention.

As shown in FIG. 14, a pressure sensor 100 according to the invention includes a physical quantity sensor 1, a housing 101 that houses the physical quantity sensor 1, and an arithmetic operation portion 102 that arithmetically operates a signal obtained from the physical quantity sensor 1 with pressure data. The physical quantity sensor 1 is electrically connected to the arithmetic operation portion 102 through a wiring 103.

The physical quantity sensor 1 is fixed to the inside of the housing 101 by a fixing unit which is not shown in the drawing. In addition, the housing 101 includes a through-hole 104 in order for the diaphragm portion 64 of the physical quantity sensor 1 to communicate with, for example, the atmosphere (the outside of the housing 101).

According to the pressure sensor 100, the diaphragm portion 64 receives a pressure through the through-hole 104. A pressure reception signal is transmitted to the arithmetic operation portion through the wiring 103, and is arithmetically operated with pressure data. The pressure data arithmetically operated can be displayed through a display portion (such as, for example, a monitor of a personal computer) which is not shown in the drawing.

3. Altimeter

Figure 15:
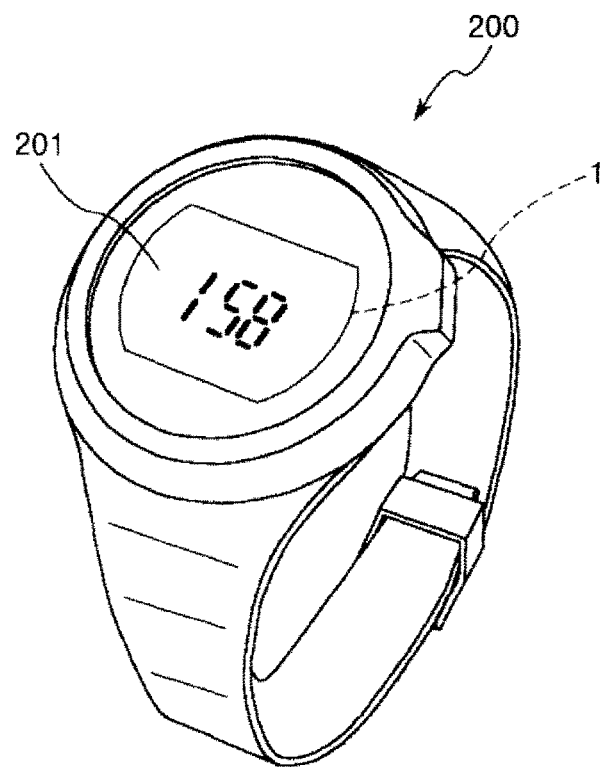
FIG. 15 is a perspective view illustrating an example of an altimeter according to the invention.

Next, an example of an altimeter (altimeter according to the invention) including the physical quantity sensor according to the invention will be described. FIG. 15 is a perspective view illustrating an example of the altimeter according to the invention.

An altimeter 200 can be worn on a wrist like a watch. In addition, the altimeter 200 has the physical quantity sensor 1 (pressure sensor 100) mounted therein, and can display the altitude from the height above sea level of a present location, the air pressure of a present location, or the like, on a display portion 201.

Various information, such as the current time, the heart rate of a user, the weather, and the like can be displayed on this display portion 201.

4. Electronic Apparatus

Figure 16:
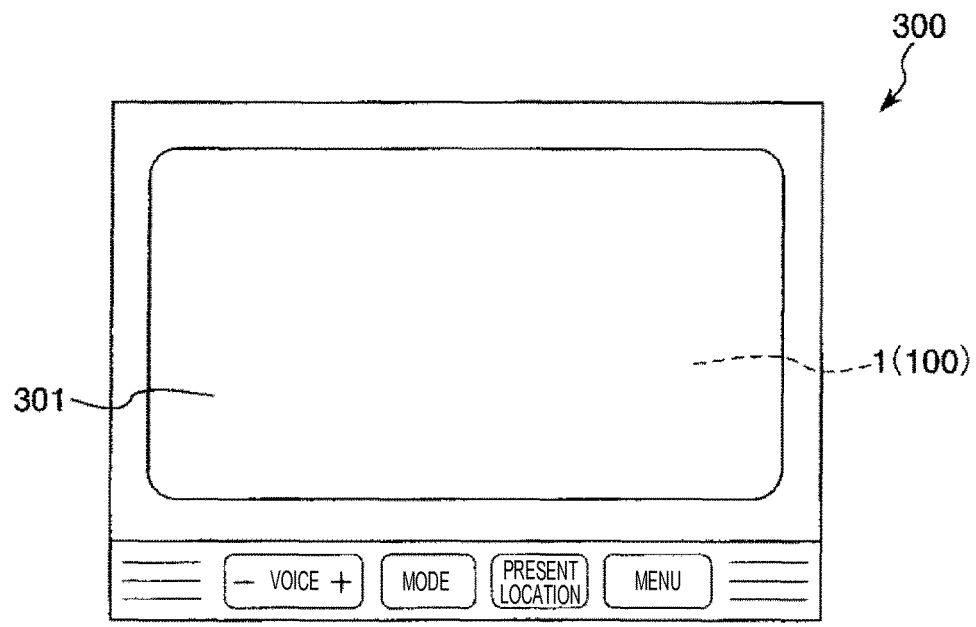
FIG. 16 is a front view illustrating an example of an electronic apparatus according to the invention.

Next, a navigation system to which an electronic apparatus including the physical quantity sensor according to the invention is applied will be described. FIG. 16 is a front view illustrating an example of an electronic apparatus according to the invention.

A navigation system 300 includes map information (not shown), a position information acquisition unit from a GPS (Global Positioning System), a self-contained navigation unit based on a gyro sensor, an acceleration sensor and vehicle speed data, the physical quantity sensor 1, and the display portion 301 that displays predetermined position information or course information.

According to this navigation system, altitude information can be acquired in addition to the acquired position information. For example, in the case of traveling along a high-level road indicating substantially the same position as that of an ordinary road on the position information by obtaining the altitude information, whether traveling along an ordinary road or whether traveling along a high-level road is not able to be determined in the navigation system when there is no altitude information, and information of an ordinary road is provided to a user as priority information. Consequently, in the navigation system 300 according to the present embodiment, the altitude information can be acquired by the physical quantity sensor 1, and navigation information in a traveling condition of a high-level road can be provided to a user by detecting a change in altitude caused by entry from an ordinary road into a high-level road.

The display portion 301 is formed of, for example, a liquid crystal panel display, an organic EL (Organic Electro-Luminescence) display, or the like which can be reduced in size and thickness.

The electronic apparatus including the physical quantity sensor according to the invention is not limited to the above examples, and can be applied to, for example, a personal computer, a cellular phone, medical instruments (for example, an electronic thermometer, a sphygmomanometer, a blood glucose monitoring system, an electrocardiogram measurement device, an ultrasound diagnostic device, and an electronic endoscope), various types of measuring apparatuses, meters and gauges (for example, meters and gauges of a vehicle, an airplane, and a vessel), a flight simulator, and the like.

5. Moving Object

Figure 17:
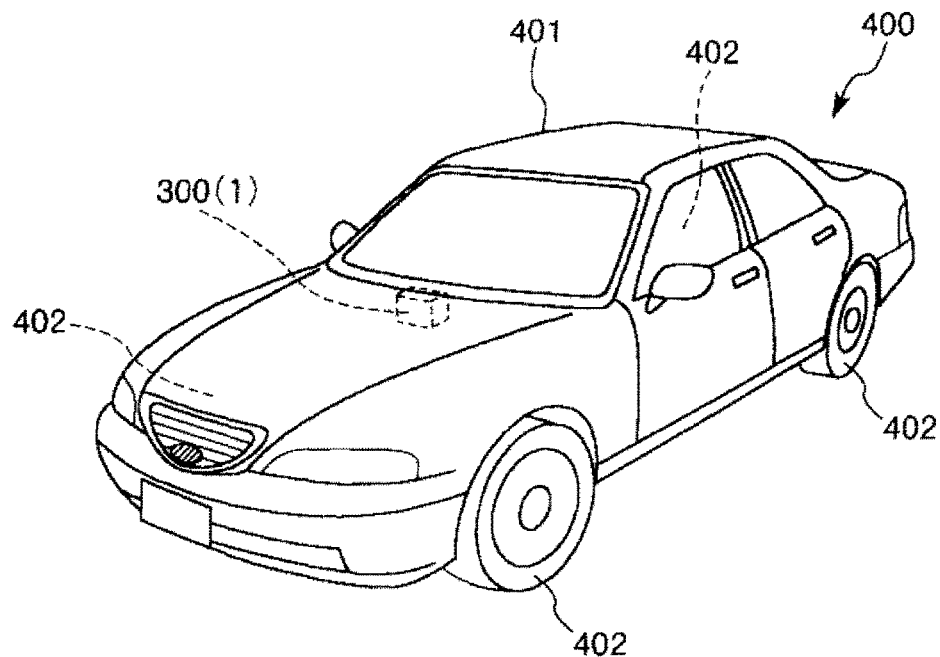
FIG. 17 is a perspective view illustrating an example of a moving object according to the invention.

Next, a moving object (moving object according to the invention) to which the physical quantity sensor according to the invention is applied will be described. FIG. 17 is a perspective view illustrating an example of the moving object according to the invention.

As shown in FIG. 17, a moving object 400 includes a car body 401 and four wheels 402, and is configured to rotate the wheels 402 using a motive power source (engine), not shown, which is provided in the car body 401. The navigation system 300 (physical quantity sensor 1) is built into the moving object 400.

As stated above, the physical quantity sensor, the pressure sensor, the altimeter, the electronic apparatus and the moving object according to the invention have been described on the basis of each of the shown embodiments, but the invention is not limited thereto, and the configuration of each portion can be replaced by any configuration having the same function. In addition, any other configurations or processes may be added.

In addition, in the aforementioned embodiment, the number of piezoresistive elements which are provided in one diaphragm portion is not limited to the aforementioned embodiments, and may be, for example, two, four or the like. In addition, the arrangement of the piezoresistive elements, the shapes thereof, and the like are not limited to the aforementioned embodiments. For example, in the aforementioned embodiments, the piezoresistive element located inside the diaphragm portion may be omitted.

In addition, in the aforementioned embodiments, the number of diaphragms which are disposed in the physical quantity sensor is not limited to those in the aforementioned embodiments, and may be, for example, six, nine, sixteen and so on. As the diaphragm is larger, an effect of improving the S/N ratio becomes higher.

The entire disclosure of Japanese Patent Application No. 2014-058505 filed Mar. 20, 2014 is expressly incorporated by reference herein.

What is claimed is:
1. A physical quantity sensor comprising:
   a plurality of diaphragm portions configured to bend and deform due to pressure changes; and
   four piezoresistive elements disposed in each of the diaphragm portions, the four piezoresistive elements being located at different locations from each other,
   wherein a first piezoresistive element in a first of the diaphragm portions is electrically connected with a corresponding first piezoresistive element in a second of the diaphragm portions in series between a first pair of electrodes, and a resistance value of both first piezoresistive elements decreases when the first of the diaphragm portions and the second of the diaphragm portions are deformed, wherein a second piezoresistive element in the first of the diaphragm portions is electrically connected with a corresponding second piezoresistive element in the second of the diaphragm portions in series between a second pair of electrodes, and a resistance value of both second piezoresistive elements decreases when the first of the diaphragm portions and the second of the diaphragm portions are deformed, wherein a third piezoresistive element in the first of the diaphragm portions is electrically connected with a corresponding third piezoresistive element in the second of the diaphragm portions in series between a third pair of electrodes, and a resistance value of both third piezoresistive elements increases when the first of the diaphragm portions and the second of the diaphragm portions are deformed, and wherein a fourth piezoresistive element in the first of the diaphragm portions is electrically connected with a corresponding fourth piezoresistive element in the second of the diaphragm portions in series between a fourth pair of electrodes, and a resistance value of both fourth piezoresistive elements increases when the first of the diaphragm portions and the second of the diaphragm portions are deformed.

2. The physical quantity sensor according to claim 1, further comprising a bridge circuit which is configured to include the four piezoresistive elements.

3. The physical quantity sensor according to claim 1, wherein the plurality of diaphragm portions is two diaphragm portions.

4. The physical quantity sensor according to claim 1, wherein the plurality of diaphragm portions is four diaphragm portions.

5. The physical quantity sensor according to claim 1, further comprising a plurality of reference pressure chambers respectively operatively associated with the plurality of diaphragm portions.

6. The physical quantity sensor according to claim 5, wherein the reference pressure chamber is formed using a semiconductor manufacturing process.

7. The physical quantity sensor according to claim 1, further comprising a single reference pressure chamber which is operatively associated in common with the plurality of diaphragm portions.

8. The physical quantity sensor according to claim 1, wherein:
   each diaphragm portion includes an outer circumferential portion and an interior portion interior of the outer circumferential portion; and
   the piezoresistive elements are respectively disposed:
      at the outer circumferential portion of the diaphragm portion; and
      at the interior portion of the diaphragm portion.

9. A pressure sensor comprising:
a housing; and
the physical quantity sensor according to claim 1 housed in the housing.

10. An electronic apparatus comprising:
a display; and
the physical quantity sensor according to claim 1 communicating with the display.

11. A moving object comprising:
a body; and
the physical quantity sensor according to claim 1 secured to the body.

12. A physical quantity sensor comprising:
a laminated substrate including:
   a handle layer;
   a box layer on the handle layer; and
   a device layer on the box layer;
a plurality of diaphragms formed by the box layer and the device layer spanning openings of the handle layer, each of the diaphragms being configured to bend and deform in response to pressure changes; and
four mutually spaced apart piezoresistive elements embedded within the device layer of each of the diaphragm portions,
wherein corresponding piezoresistive elements in separate ones of the diaphragm portions are electrically connected to each other in series between pairs of electrodes, and a resistance value of the corresponding piezoresistive elements decreases or increases when the diaphragm portions are deformed.

13. The physical quantity sensor according to claim 12, further comprising a bridge circuit which is configured to include the four piezoresistive elements.

14. The physical quantity sensor according to claim 12, further comprising a plurality of reference pressure chambers respectively enclosed by the plurality of diaphragms.

15. The physical quantity sensor according to claim 12, further comprising a single reference pressure chamber enclosed by the plurality of diaphragm portions.

* * * * *